(12) United States Patent
Gilliam et al.

(10) Patent No.: US 12,037,694 B2
(45) Date of Patent: *Jul. 16, 2024

(54) SYSTEMS AND METHODS FOR PRODUCING HYDROGEN GAS

(71) Applicant: Verdagy, Inc., Moss Landing, CA (US)

(72) Inventors: Ryan J. Gilliam, San Jose, CA (US); Brian J. Lam, San Ramon, CA (US)

(73) Assignee: Verdagy, Inc., Moss Landing, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,548

(22) Filed: Oct. 6, 2022

(65) Prior Publication Data

US 2023/0106046 A1 Apr. 6, 2023

Related U.S. Application Data

(63) Continuation of application No. 17/938,319, filed on Oct. 5, 2022.

(Continued)

(51) Int. Cl.
*C25B 15/02* (2021.01)
*C25B 1/04* (2021.01)
*C25B 9/70* (2021.01)

(52) U.S. Cl.
CPC .............. *C25B 15/02* (2013.01); *C25B 1/04* (2013.01); *C25B 9/70* (2021.01)

(58) Field of Classification Search
CPC .................................. C25B 1/04; C25B 15/02
See application file for complete search history.

(56) References Cited

U.S. PATENT DOCUMENTS

| 5,225,060 A * | 7/1993 | Noaki | C25B 9/77 204/257 |
| 2016/0040308 A1* | 2/2016 | Stucki | C25B 1/18 205/508 |

(Continued)

FOREIGN PATENT DOCUMENTS

| CN | 111270256 A | * 6/2020 | ............... C25B 1/04 |
| CN | 113325712 | 8/2021 | |

(Continued)

OTHER PUBLICATIONS

Zhang et al ("Flexible grid-based electrolysis hydrogen production for fuel cell vehicles reduces costs and greenhouse gas emissions", Applied Energy, vol. 278, Nov. 15, 2020, 115651), (Year: 2020).*

(Continued)

*Primary Examiner* — Alexander W Keeling
(74) *Attorney, Agent, or Firm* — Schwegman Lundberg & Woessner, P.A.

(57) ABSTRACT

A method for carrying out electrolysis comprises dynamically changing a current density associated with an operation of an electrolyzer within a range of values of about 0.15 A/cm$^2$ and 3.0 A/cm2, wherein the changing of the current density associated with the operation of the electrolyzer is in response to a change in demand for electricity within a region where the electrolyzer is located, and wherein the changing of the current density comprises lowering the current density within the range of values of about 0.15 A/cm$^2$ and 3.0 A/cm$^2$ when the demand for electricity increases within the region where the electrolyzer is located and raising the current density within the range of values of about 0.15 A/cm$^2$ and 3.0 A/cm$^2$ when the demand for electricity decreases within the region where the electrolyzer is located.

15 Claims, 19 Drawing Sheets

Related U.S. Application Data

(60) Provisional application No. 63/252,552, filed on Oct. 5, 2021.

(56) References Cited

U.S. PATENT DOCUMENTS

| | | | |
|---|---|---|---|
| 2016/0237858 A1* | 8/2016 | Bergins | .............. C25B 1/02 |
| 2022/0118406 A1 | 4/2022 | Lackner | |
| 2023/0107017 A1 | 4/2023 | Gilliam et al. | |

FOREIGN PATENT DOCUMENTS

| | | | | |
|---|---|---|---|---|
| CN | 113325712 A | * | 8/2021 | .............. C25B 1/04 |
| EP | 0111149 | | 6/1984 | |
| EP | 1229148 | | 8/2002 | |
| EP | 1580303 | | 9/2005 | |
| EP | 3604617 | | 2/2020 | |
| WO | 2016169813 | | 10/2016 | |
| WO | 2020132064 | | 6/2020 | |
| WO | 2023060146 | | 4/2023 | |
| WO | 2023060146 | | 5/2023 | |

OTHER PUBLICATIONS

Gruger et al ("Optimized electrolyzer operation: Employing forecasts of wind energy availability, hydrogen demand, and electricity prices", International Journal of Hydrogen Energy, vol. 44, Issue 9, Feb. 15, 2019, pp. 4387-4397). (Year: 2019).*

"U.S. Appl. No. 17/938,319, Restriction Requirement mailed Feb. 22, 2023", 7 pgs.

"U.S. Appl. No. 17/938,319, Response filed Mar. 14, 2023 to Restriction Requirement mailed Feb. 22, 2023", 8 pgs.

"U.S. Appl. No. 17/938,319, Non Final Office Action mailed Mar. 22, 2023", 10 pgs.

"NREL ("Technology Brief: Analysis of Current-Day Commercial Electrolyzers", 2004)", 2 pgs.

"International Application Serial No. PCT US2022 077632, International Search Report mailed Apr. 12, 2023", 5 pgs.

"International Application Serial No. PCT US2022 077632, Written Opinion mailed Apr. 12, 2023", 7 pgs.

"U.S. Appl. No. 17/938,319, Examiner Interview Summary mailed Jan. 25, 2024", 2 pages.

"U.S. Appl. No. 17/938,319, Response filed Sep. 22, 2023 to Non Final Office Action mailed Mar. 22, 2023", 13 pgs.

"U.S. Appl. No. 17/938,319, Final Office Action mailed Nov. 30, 2023", 17 pgs.

"International Application Serial No. PCT US2022 077632, International Preliminary Report on Patentability mailed Apr. 18, 2024", 9 pgs.

U.S. Appl. No. 17/938,319, Response filed Apr. 30, 2024 to Final Office Action mailed Nov. 30, 2023, 15 pages.

* cited by examiner

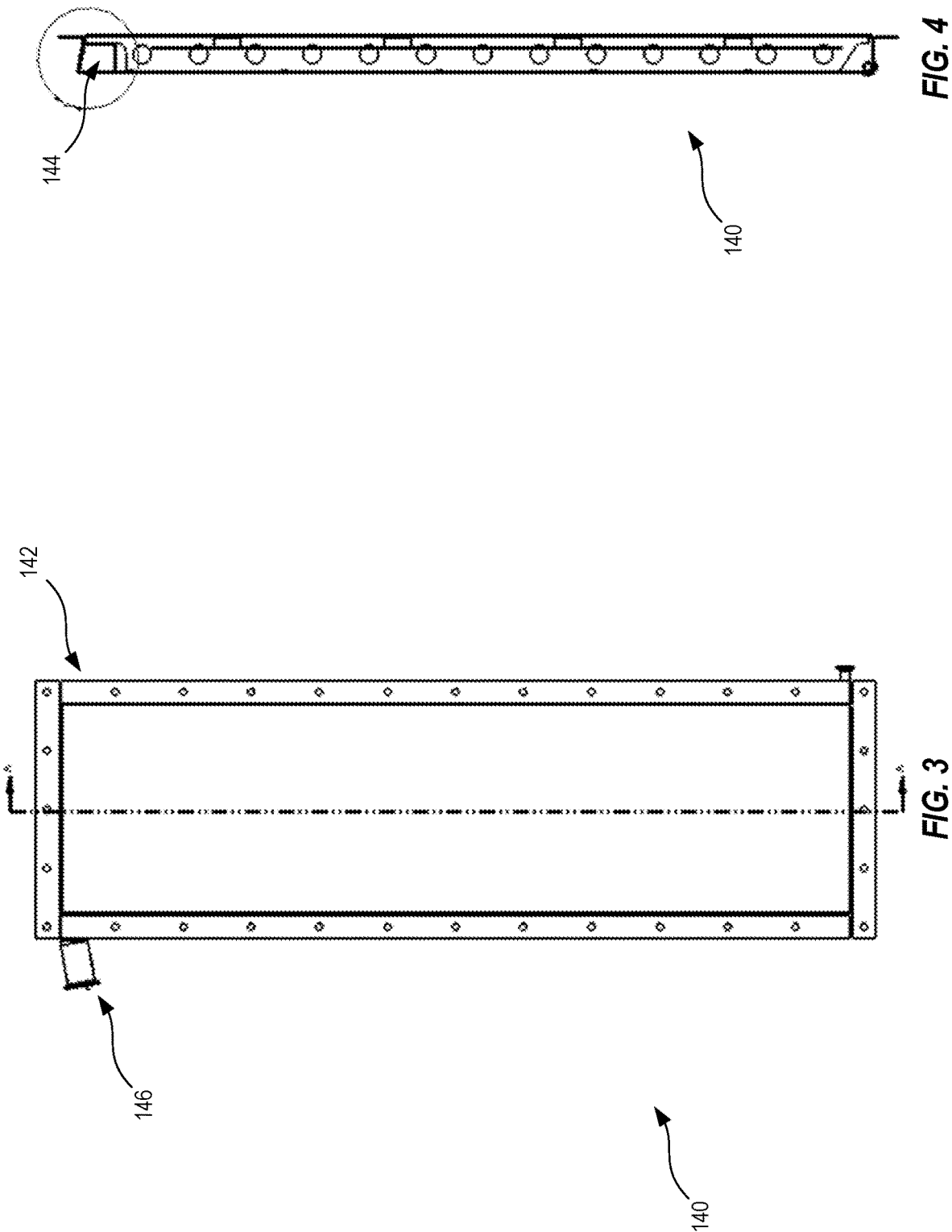

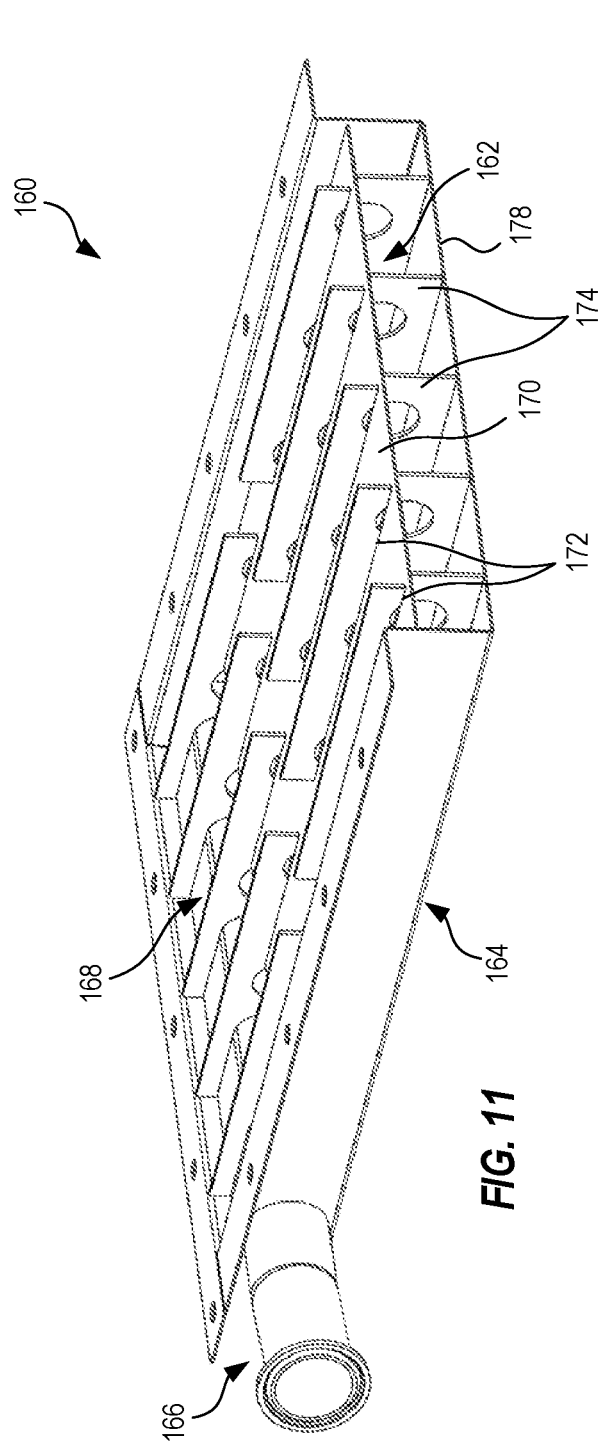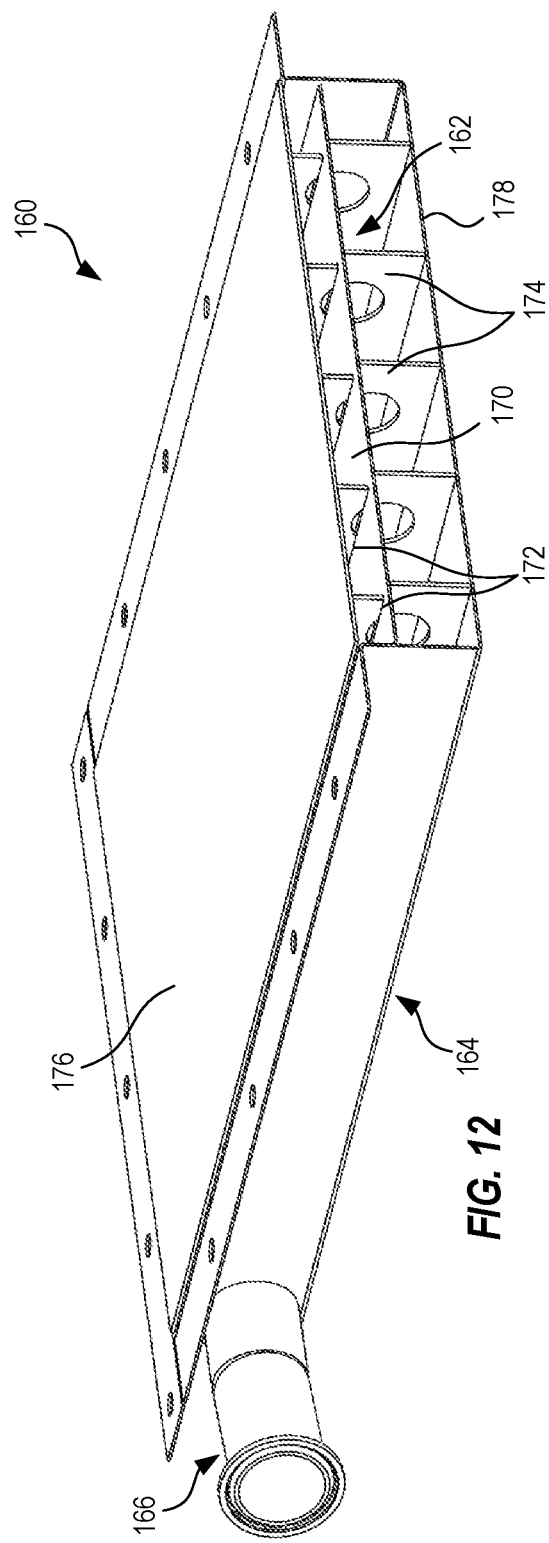

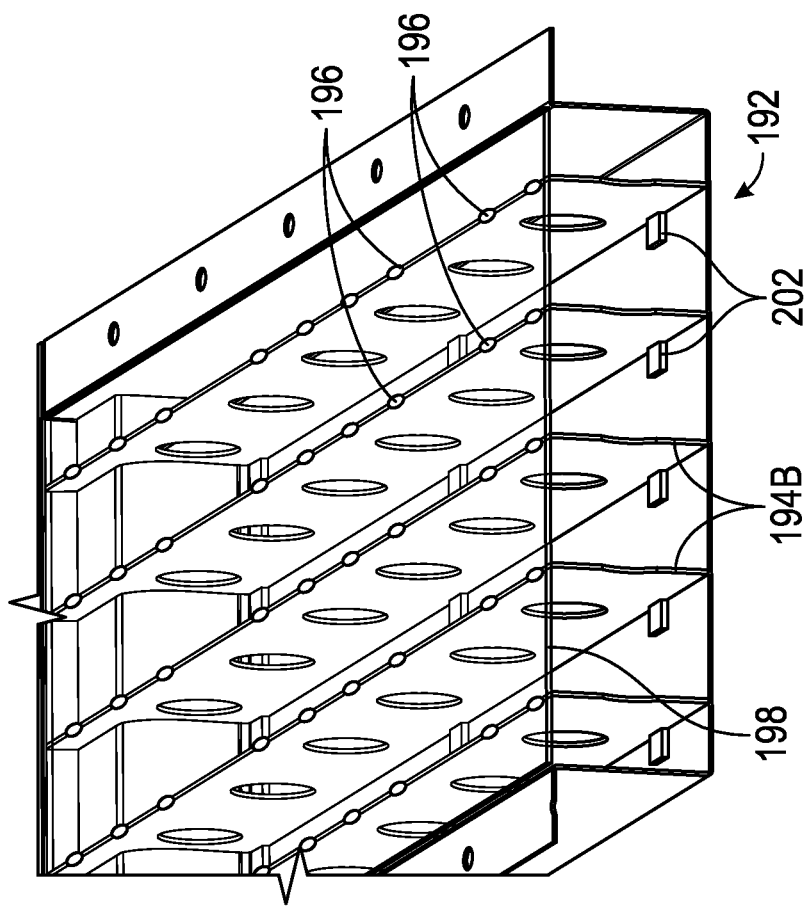
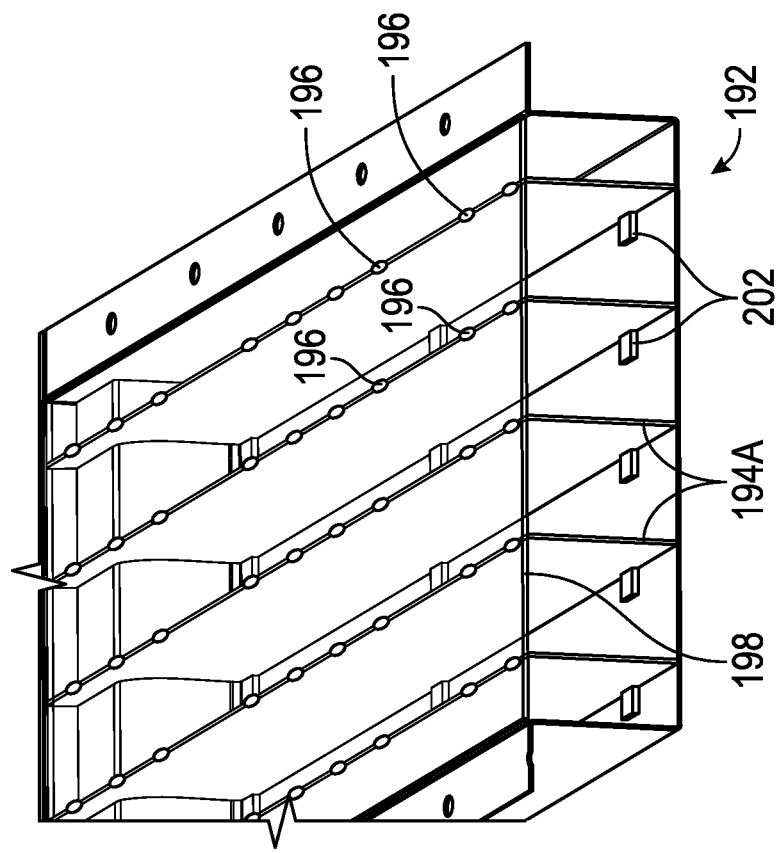

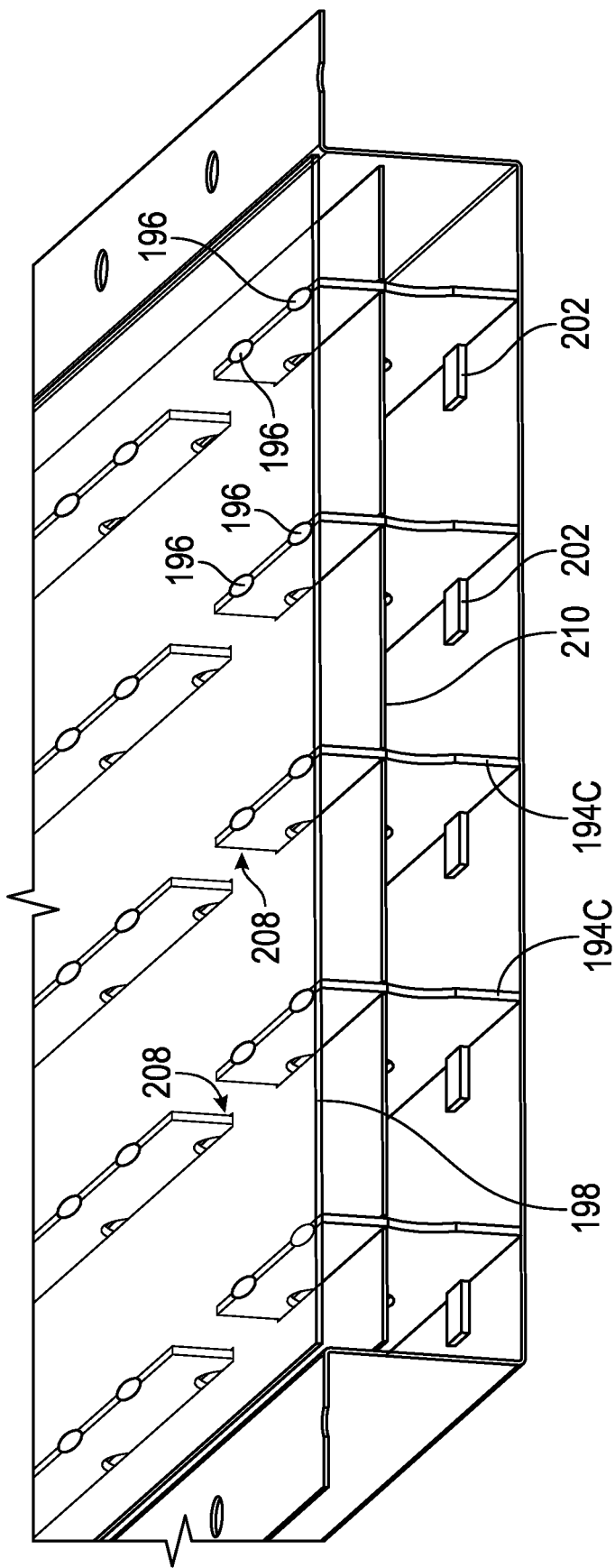

SYSTEMS AND METHODS FOR PRODUCING HYDROGEN GAS

CROSS-REFERENCE TO RELATED APPLICATIONS

This application is a continuation of and claims the benefit of priority under 35 § 120 to U.S. application Ser. No. 17/938,319, filed on Oct. 5, 2022, entitled "SYSTEMS AND METHODS FOR PRODUCING HYDROGEN GAS," which application claims the benefit of priority under 35 U.S.C. § 119(e) to U.S. Provisional Application Ser. No. 63/252,552, filed on Oct. 5, 2021, entitled "LOW COST HYDROGEN GAS PRODUCTION," the disclosures of which are incorporated herein by reference in their entireties.

BACKGROUND

As electricity production migrates to lower carbon dioxide ($CO_2$) footprint technologies, the ability to convert electricity into low-carbon or zero-carbon transportation fuels is becoming an increasingly important challenge in mitigating global $CO_2$ emissions. Among the options for such fuels, hydrogen gas ($H_2$) has a unique advantage in that its oxidation product is water. Thus, hydrogen gas represents a low-carbon transportation fuel if it can be manufactured with a low-carbon footprint.

SUMMARY

The present disclosure describes systems and methods that relate to the production of hydrogen gas ($H_2$) via electrolysis of water. In particular, the present disclosure describes systems and methods that allow for low overall plant capital expenditure and that can provide for reduced operating expenses for the production of $H_2$ gas by water electrolysis, e.g., on a cost per kilowatt or a cost per $H_2$ production capacity basis.

In one aspect, the present disclosure describes an electrolyzer system comprising one or more electrolyzer cells each comprising a first half cell with a first electrode and a second half cell with a second electrode and a controller to control a current applied through the one or more electrolyzer cells, wherein the controller is configured to dynamically set the current density within a current density range of from about 150 mA/cm$^2$ to about 3000 mA/cm$^2$, and wherein the controller is configured to set the current density to a first value when a first condition is met and to a second value when a second condition is met.

In some examples of the foregoing aspect, the first value is at or below a first percentage of a maximum capacity current density of the electrolyzer cell and the second value is at or above a second percentage of the maximum capacity current density of the electrolyzer cell.

In some examples of the foregoing aspects, the first percentage is 20% or less of the maximum capacity current density.

In some examples of the foregoing aspects, the second percentage is 80% or more of the maximum capacity current density.

In some examples of the foregoing aspects, the first half cell comprises a pan, one or more ribs inside the pan, and a baffle plate coupled to the one or more ribs, wherein the baffle plate partitions a volume in the pan to provide a riser region on a first side of the pan proximate to the first electrode and a down-comer region on a second side of the baffle plate opposite the first side.

In some examples of the foregoing aspects, wherein the riser region facilitates gas formed at the first electrode to rise and avoid formation of gas pockets, and wherein the down-corner region facilitates downward flow of an electrolyte solution, wherein the rise of the gas and the downward flow of the electrolyte solution causes circulation in the pan that facilitates thermal equilibrium and reduced temperature variation in the electrolyte.

In some examples of the foregoing aspects, the first half cell comprises a pan, a manifold positioned inside the pan, and an outlet tube exiting the manifold for electrolyte to exit the pan, wherein a cross-sectional area of the manifold is configured so that an electrolyte flow rate and a gas flow rate through the manifold are low enough to avoid slug flow or plug flow.

In some examples of the foregoing aspects, the first half cell comprises a pan, one or more ribs positioned vertically inside the pan, and a plurality of welds that weld the first electrode to the one or more ribs, wherein the plurality of welds form a distributed array of welds across the electrode that distribute current across the electrode during operation of the electrochemical cell.

In some examples of the foregoing aspects, each electrolyzer cell further comprises a separator between the first half cell and the second half cell, wherein a number, size, and positions of the plurality of welds are such that an impact of power dissipation on a temperature of the separator is reduced to reduce damage due to high local temperature.

In another aspect, an electrolyzer system comprises a plurality of electrolyzer cells, wherein each electrolyzer cell comprises a first half cell with a first electrode, a second half cell with a second electrode, and a separator separating the first half cell from the second half cell. The electrolyzer system further includes a power supply configured to apply a current through each of the plurality of electrolyzer cells so that a current density through each of plurality of electrolyzer cells is within a current density range of from about 150 mA/cm$^2$ to about 3000 mA/cm$^2$, and a controller to dynamically control the current density of each of the plurality of electrolyzer cells between a first current density range of 750 mA/cm$^2$ or less and a second current density range of 1 mA/cm$^2$ or more.

In some examples of the foregoing aspect, the first half cell comprises a pan, one or more ribs inside the pan, and a baffle plate coupled to the one or more ribs, wherein the baffle plate partitions a volume in the pan to provide a riser region on a first side of the pan proximate to the first electrode and a down-corner region on a second side of the baffle plate opposite the first side.

In some examples of the foregoing aspects, the first half cell comprises a pan, a manifold positioned inside the pan, and an outlet tube exiting the manifold for electrolyte to exit the pan, wherein a cross-sectional area of the manifold is configured so that an electrolyte flow rate and a gas flow rate through the manifold are low enough to avoid slug flow or plug flow.

In some examples of the foregoing aspects, the first half cell comprises a pan, one or more ribs positioned vertically inside the pan, and a plurality of welds that weld the first electrode to the one or more ribs, wherein the plurality of welds form a distributed array of welds across the electrode that distribute current across the electrode during operation of the electrochemical cell.

In some examples of the foregoing aspects, each electrolyzer cell further comprises a separator between the first half cell and the second half cell, wherein a number, size, and positions of the plurality of welds are such that an impact of power dissipation on a temperature of the separator is reduced to reduce damage due to high local temperature.

In another aspect, a method for carrying out electrolysis comprises dynamically changing a current density associated with an operation of an electrolyzer within a range of values of about 0.15 A/cm² and 3.0 A/cm², wherein the changing of the current density associated with the operation of the electrolyzer is in response to a change in demand for electricity within a region where the electrolyzer is located, and wherein the changing of the current density comprises lowering the current density within the range of values of about 0.15 A/cm² and 3.0 A/cm² when the demand for electricity increases within the region where the electrolyzer is located and raising the current density within the range of values of about 0.15 A/cm² and 3.0 A/cm² when the demand for electricity decreases within the region where the electrolyzer is located.

In some examples of the foregoing aspect, the change in demand occurs for a period of time when the demand is fluctuating.

In some examples of the foregoing aspect, the demand fluctuating comprises increases and decreases of demand within the period of time.

In some examples of the foregoing aspect, an average demand over the period of time is elevated compared to another period of time.

In some examples of the foregoing aspect, an average demand over the period of time is decreased compared to another period of time.

In some examples of the foregoing aspect, the period of time is one where demand typically increases or decreases.

In some examples of the foregoing aspect, the period of time is between specific hours within a day.

In some examples of the foregoing aspect, the electrolyzer comprises at least two separate electrolyzer cells.

In some examples of the foregoing aspect, the electrolyzer has a total size of at least about 2.5 m³.

In some examples of the foregoing aspect, when the demand for electricity increases within the region where the electrolyzer is located, an operating expenditure of the electrolyzer increases unless the current density is decreased.

In another aspect, a method for carrying out electrolysis comprises: (a) reducing a current density associated with an operation of an electrolyzer to 20% or less of a maximum capacity of the current density of the electrolyzer when demand for electricity increases in a region where the electrolyzer is located, and (b) increasing the current density associated with an operation of an electrolyzer to 80% or more of a maximum capacity of the current density of the electrolyzer when demand for electricity decreases in a region where the electrolyzer is located.

In some examples of the foregoing aspect, the demand for electricity increases or the demand for electricity decreases during a period of time when demand is fluctuating.

In some examples of the foregoing aspect, the demand fluctuating comprises increases and decreases of demand within the period of time.

In some examples of the foregoing aspect, an average demand over the period of time is elevated compared to another period of time.

In some examples of the foregoing aspect, an average demand over the period of time is decreased compared to another period of time.

In some examples of the foregoing aspect, the period of time is one where demand typically increases or decreases.

In some examples of the foregoing aspect, the period of time is between specific hours within a day.

In some examples of the foregoing aspect, the electrolyzer comprises at least two separate cells.

In some examples of the foregoing aspect, the electrolyzer has a total size of at least 2.5 m³.

In some examples of the foregoing aspect, when the demand for electricity increases within the region where the electrolyzer is located, an operating expenditure of the electrolyzer increases unless the current density is decreased.

BRIEF DESCRIPTION OF THE DRAWINGS

The drawings illustrate generally, by way of example, but not by way of limitation, various embodiments discussed in the present document.

FIG. 3 is a front view of an example pan assembly that can form an anode half cell, a cathode half cell, or both in an electrolyzer cell.

FIG. 4 is a side view of the example pan assembly of FIG. 3.

FIG. 11 is a perspective view of the second example pan assembly of FIGS. 9 and 10, which shows details of a baffle assembly located within the second example pan assembly.

FIG. 12 is a perspective view of the second example pan assembly of FIGS. 9 and 10 with an electrode coupled to the baffle assembly.

FIGS. 20A-20C show perspective views of various alternative rib structures for the third example pan assembly of FIGS. 16 and 17.

DETAILED DESCRIPTION

Figure 1:
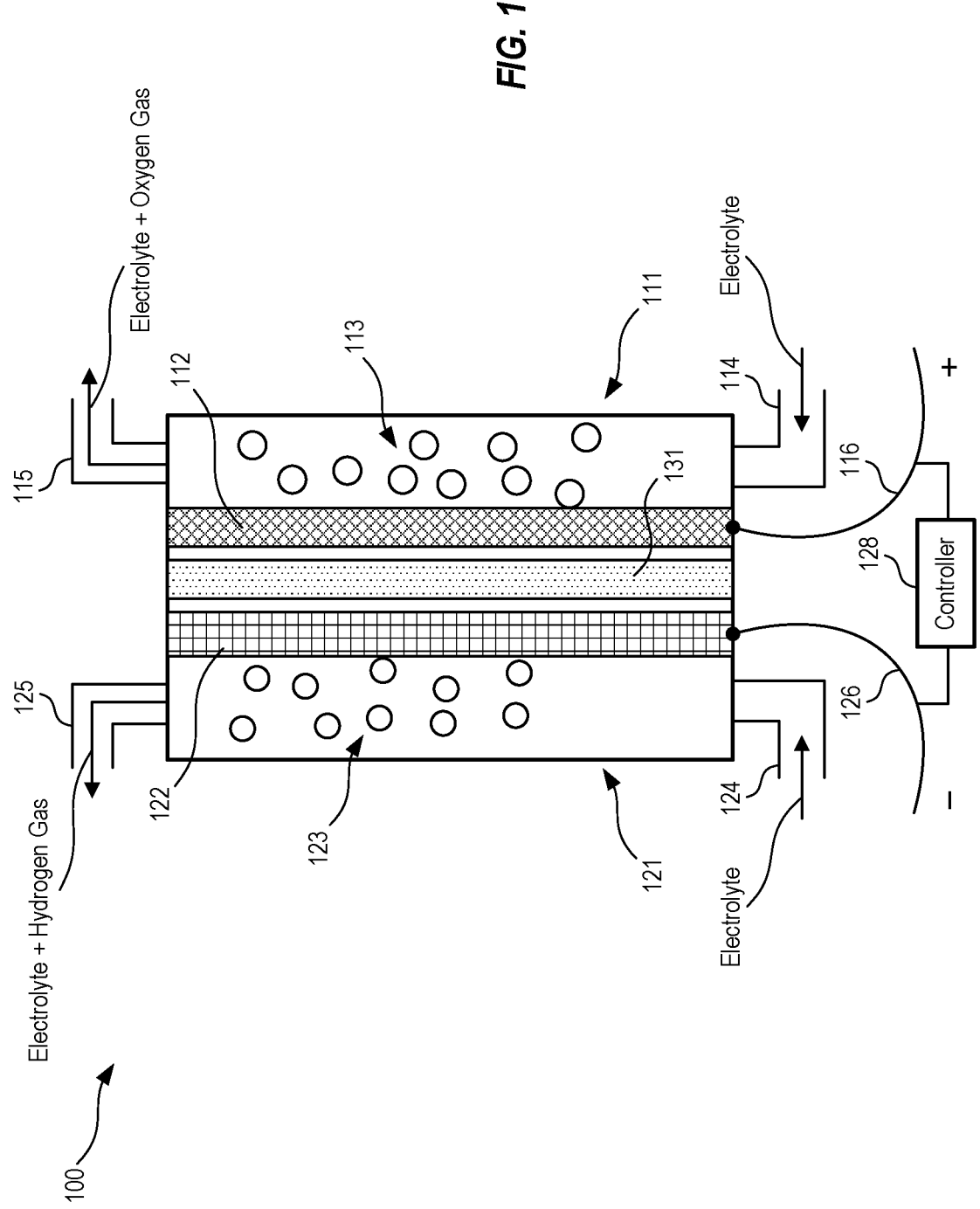
FIG. 1 is a schematic diagram of an example electrolyzer cell for the electrolysis of water to produce hydrogen gas.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G; F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Hydrogen gas ($H_2$) can be formed electrochemically by a water-splitting reaction where water is split into oxygen gas ($O_2$) and $H_2$ gas at an anode and a cathode of an electrochemical cell, respectively. Examples of such electrochemical processes include, without limitation, proton electrolyte membrane (PEM) electrolysis and alkaline water electrolysis (AWE). In such electrochemical reactions, the operating energy necessary to drive the water-splitting electrolysis reaction is high due to additional energy costs as a result of various energy inefficiencies. For example, to reduce unwanted migration of ionic species between the electrodes, the cathode and the anode may be separated by a separator, such as a membrane, which can reduce migration of the ionic species. Although the separator can improve the overall efficiency of the cell, it can come at a cost of additional resistive losses in the cell, which in turn increases the operating voltage. Other inefficiencies in water electrolysis can include solution resistance losses, electric conduction inefficiencies, and/or electrode over-potentials, among others. These various inefficiencies and the capital costs associated with minimizing them can play a role in the economic viability of $H_2$ generation via water splitting electrolysis.

The methods and systems provided herein relate to unique electrochemical processes that result in efficient, low cost, and low energy production of $H_2$ gas.

Electrolyzer Cell

FIG. 1 is a schematic diagram of a generic water electrolyzer cell 100 that converts water into hydrogen and oxygen with electrical power is illustrated in FIG. 1. In an example, the electrolyzer cell 100 comprises two half cells: a first half cell 111 and a second half cell 121. In an example, the first and second half cells 111, 121 are separated by a separator 131, such as a membrane 131. In an example, the separator 131 comprises a porous or an ion-exchange membrane 131. In examples wherein the separator 131 comprises an ion-exchange membrane, the ion-exchange membrane can be of different types, such as an anion exchange membrane (AEM), a cation exchange membrane (CEM), a proton exchange membrane (PEM), a bipolar ion exchange membrane (BEM), an ion solvating membrane (ISM), or a microporous or nanoporous membrane.

In examples where the separator 131 is a cation exchange membrane, the cation exchange membrane can be a conventional membrane such as those available from, for example, Asahi Kasei Corp. of Tokyo, Japan, or from Membrane International Inc. of Glen Rock, NJ, USA, or from The Chemours Company of Wilmington, DE, USA. Examples of cation exchange membranes include, but are not limited to, the membrane sold under the N2030WX trade name by The Chemours Company and the membrane sold under the F8020/F8080 or F6801 trade names by the Asahi Kasei Corp. Examples of materials that can be used to form a cationic exchange membrane include, but are not limited to, cationic membranes comprising a perfluorinated polymer containing anionic groups, for example sulphonic and/or carboxylic groups. It may be appreciated, however, that in some examples, depending on the need to restrict or allow migration of a specific cation or an anion species between the electrolytes, a cation exchange membrane that is more restrictive and thus allows migration of one species of cations while restricting the migration of another species of cations may be used. Similarly, in some embodiments, depending on the need to restrict or allow migration of a specific anion species between the electrolytes, an anion exchange membrane that is more restrictive and thus allows migration of one species of anions while restricting the migration of another species of anions may be used. Such restrictive cation exchange membranes and anion exchange membranes are commercially available and can be selected by one ordinarily skilled in the art.

In some examples, the separator 131 can be selected so that it can function in an acidic and/or an alkaline electrolytic solution, as appropriate. Other properties for the separator 131 that may be desirable include, but are not limited to, high ion selectivity, low ionic resistance, high burst strength, and high stability in electrolytic solution in a temperature range of room temperature to 150° C. or higher.

In an example, the separator 131 is stable in a temperature range of from about 0° C. to about 150° C., for example from about 0° C. to about 100° C., such as from about 0° C. to about 90° C., for example from about 0° C. to about 80° C., such as from about 0° C. to about 70° C., for example from about 0° C. to about 60° C., such as from about 0° C., to about 50° C., for example from about 0° C. to about 40° C., or such as from about 0° C. to about 30° C.

It may be useful to use an ion-specific ion exchange membrane that allows migration of one type of ion (e.g., cation for a CEM and anion for an AEM) but not another, or migration of one type of ion and not another, to achieve a desired product or products in the electrolyte solution.

In an example, the first half cell 111 comprises a first electrode 112, which can be placed proximate to the separator 131, and the second half cell 121 comprises a second electrode 122, which can be placed proximate to the separator 131, for example on an opposite side of the separator 131 from the first electrode 112. In an example, the first electrode 112 is the anode for the electrolyzer cell 100 and the second electrode 122 is the cathode for the electrolyzer cell 100, such that for the remainder of the present disclosure the first half cell 111 may also be referred to as the anode half cell 111, the first electrode 112 may also be referred to as the anode 112, the second half cell 121 may also be referred to as the cathode half cell 121, and the second electrode 122 may also be referred to as the cathode 122. Each of the electrodes 112, 122 can be coated with one or more electrocatalysts to speed the reaction toward the hydrogen gas ($H_2$ gas) and/or the oxygen gas ($O_2$ gas). Examples of electrocatalysts include, but are not limited to, highly dispersed metals or alloys of platinum group metals, such as platinum, palladium, ruthenium, rhodium, iridium, or their combinations such as platinum-rhodium, platinum-ruthenium, a nickel mesh coated with ruthenium oxide ($RuO_2$), or a high-surface area nickel.

The ohmic resistance of the separator 131 can affect the voltage drop across the anode 112 and the cathode 122. For example, as the ohmic resistance of the separator 131 increases, the voltage across the anode 112 and the cathode 122 may increase, and vice versa. In an example, the separator 131 has a relatively low ohmic resistance and a relatively high ionic mobility. In an example, the separator 131 has a relatively high hydration characteristics that increase with temperature, and thus decreases the ohmic resistance. By selecting a separator 131 with lower ohmic resistance known in the art, the voltage drop across the anode 112 and the cathode 122 at a specified temperature can be lowered.

In an example, the anode 112 is electrically connected to an external positive conductor 116 and the cathode 122 is electrically connected to an external negative conductor 126. When the separator 131 is wet and is in electrolytic contact with the electrodes 112 and 122, and an appropriate voltage is applied across the conductors 116 and 126, $O_2$ gas is liberated at the anode 112 and $H_2$ gas is liberated at the cathode 122. In certain configurations, an electrolyte, e.g., one comprising of a solution of KOH in water, is fed into the half cells 111, 121. For example, the electrolyte can flow into the anode half cell 111 through a first electrolyte inlet 114 and into the cathode half cell 121 through a second electrolyte inlet 124. In an example, the flow of the electrolyte through the anode half cell 111 picks up the produced $O_2$ gas as bubbles 113, which exits the anode half cell 111 through a first outlet 115. Similarly, the flow of the electrolyte through the cathode half-cell 121 can pick up the produced $H_2$ gas as bubbles 123, which can exit the cathode half cell 121 through a second outlet 125. The gases can be separated from the electrolyte downstream of the electrolyzer cell 100 with one or more appropriate separators. In an example, the produced $H_2$ gas is dried and harvested into high pressure canisters or fed into further process elements. The $O_2$ gas can be allowed to simply vent into the atmosphere or can be stored for other uses. In an example, the electrolyte is recycled back into the half cells 111, 121 as needed.

In an example, a controller 128 can be included to control the current applied through the electrolyzer cell 100 (for example by controlling a voltage that is applied across the conductors 116 and 126). In an example, the controller 128 can be configured to control an operating current density for the cell 100 (e.g., by applying a current that corresponds to a desired current density based on the area of the cell 100) so that the current density for the cell 100 can be controlled (e.g., for load gaining or load shedding as described in more detail below).

In an example, a typical voltage across the electrolyzer cell 100 is from about 1.5 volts (V) to about 3.0 V. In an example, an operating current density for the electrolyzer cell 100 is from about 0.1 A/cm$^2$ to about 3 A/cm$^2$. Each cell 100 has a size that is sufficiently large to produce a sizeable amount of $H_2$ gas when operating at these current densities. In an example, a cross-sectional area of each cell 100 (e.g., a width multiplied by a height for a rectangular cell) is from about 0.25 square meters (m$^2$) to about 15 m$^2$, such as from about 1 m$^2$ to about 5 m$^2$, for example from about 2 m$^2$ to about 4 m$^2$, such as from about 2.25 m$^2$ to about 3 m$^2$, such as from about 2.5 m$^2$ to about 2.9 m$^2$. In an example, the total volume of each cell (e.g., a width multiplied by a height multiplied by a depth) is from about 0.1 cubic meter (m$^3$) to about 2 m$^3$, such as from about 0.15 m$^3$ to about 1.5 m$^3$, for example from about 0.2 m$^3$ to about 1 m$^3$, such as from about 0.25 m$^3$ to about 0.5 m$^3$, for example from about 0.275 m$^3$ to about 0.3 m$^3$. In an example, the total volume of the entire electrolyzer system (e.g., the combined volume of all the cells in all the stacks in the plant) is from about 1 m$^3$ to about 200 m$^3$, such as from about 2 m$^3$ to about 100 m$^3$, for example from about 2.5 m$^3$ to about 50 m$^3$.

As will be appreciated by those having skill in the art, operating an electrical power bus at such a low voltage and high current density can be highly inefficient. Therefore, typically a plurality of the electrolyzer cells 100 are assembled and electrically connected in series into an electrolyzer stack. Each of the plurality of cells 100 can operate at a lower higher voltage and at the same current density as a single electrolyzer cell 100, which makes the system far more efficient. In an example, an electrolyzer stack can comprise from about five (5) electrolyzer cells 100 to about 500 electrolyzer cells 100, for example eighty (80) electrolyzer cells 100 or more connected in series to provide an electrolyzer stack.

Electrolyzer Stack

Figure 2:
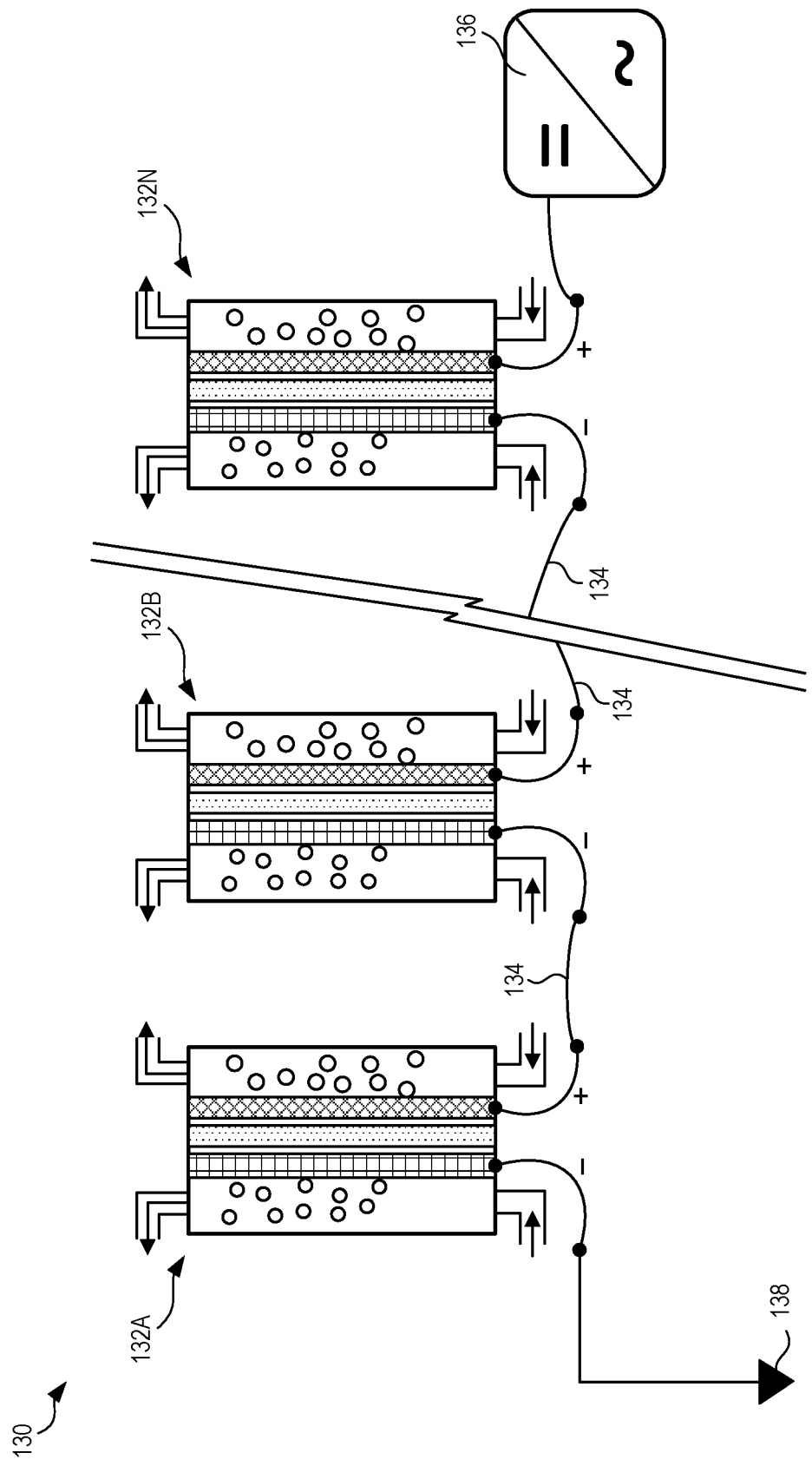
FIG. 2 is a schematic view of a stack comprising a plurality of electrolyzer cells configured for the electrolysis of water to produce hydrogen gas.

FIG. 2 shows a schematic diagram of a portion of such an electrolyzer stack 130 of electrolyzer cells 132A-132N (collectively referred to as "electrolyzer cells 132" or "electrolyzer cell 132"). Each cell 132 in the stack 130 can have any one of the structures described above with respect to the example electrolyzer cell 100 of FIG. 1, e.g., with one or both of the anode half cell 111 and the cathode half cell 121. In addition, each cell 132 can include one or more structures of the cell assemblies (e.g., comprising one or more structures of the pan assemblies described below). As will be appreciated by those having skill in the art, the structures of the cell assemblies (i.e., for individual pan assemblies) can provide for the overall lower cost $H_2$ production described herein.

In an example, the electrolyzer cells 132 are connected electrically in series with conductors 304. In an example, the stack 130 comprises a large number of electrolyzer cells 132 connected in series, e.g., fifty (50) or more electrolyzer cells 132, sixty (60) or more electrolyzer cells 132, seventy (70) or more electrolyzer cells 132, eighty (80) or more electrolyzer cells 132, ninety (90) or more electrolyzer cells 132, one hundred (100) or more electrolyzer cells 132, one hundred fifty (150) or more electrolyzer cells 132, two hundred (200) or more electrolyzer cells 132, three hundred (300) or more electrolyzer cells 132, and so on. The individual electrolyzer cells 132 in the example electrolyzer stack 130 are labeled with reference numbers 132A through 132N, with only the first electrolyzer cell 132A, the second electrolyzer cell 132B, and the last electrolyzer cell 132N being shown in FIG. 2. In an example, the electrical positive conductor (e.g., the positive conductor 116 in FIG. 1) of one cell 132A is electrically connected to the electrical negative conductor of the subsequent cell 132B (e.g., the negative conductor 126 in FIG. 1) with a connecting conductor 134, with the following exceptions: (a) the positive conductor of the final cell 132N at the highest voltage is connected to a power supply 136; and (b) the negative conductor of the first cell 132A at the lowest voltage is connected to a ground 138 of the electrical circuit. In an example, the power supply 136 is a constant-current voltage-limited rectifier that converts grid AC power to a suitable DC power level. In an example, the power supply 136 can be controlled by a controller that is configured to control the current density of the electrolyzer cells 132 in the stack 130 (similar to the controller 128 described above with respect to FIG. 1), for example to allow the stack to be dynamically operated for load gaining or load shedding in response to fluctuations in electricity demand and/or price (as described in more detail below).

Electrolyzer Cell Pan Assembly

The physical configuration of the electrolyzer cell 100 can be any physical structure configured to allow for the liberation of oxygen gas at the anode 112 and for the liberation of hydrogen gas at the cathode 122. In an example, the electrolyzer cell 100 can comprise components that can dynamically operate at high current densities (e.g., at 2 A/cm$^2$ or higher). By providing for operation at high current densities, the electrolyzer cells 100 can allow operators to meet their targeted production rate with fewer cells, thereby reducing capital expenses. In addition, by allowing the electrolyzer cells 100 to dynamically operate over a wide range of operational current densities, the electrolyzer cells 100 can provide operators with a large turndown ratio, which can enable the operators to maximize production when power prices are low, and to reduce power consumption when power prices are high (as described in more detail below).

The operation of electrolyzer cells at high current densities can result in significant challenges, such as, but not limited to, large gas volumes produced at high current densities, significant temperature and pressure fluctuations, membrane erosion or fatigue, large amount of heat generated in the cell, and/or high flow rates of electrolyte. Therefore, in an example, each electrolyzer cell 100 can include a configuration of an anode pan assembly and/or a cathode pan assembly that can overcome one or more of these challenges, such as, but not limited to, reducing or minimizing large temperature variations of the electrolyte along the height of the cell; reducing or minimizing masking of the nominal active area with gas; reducing or minimizing formation of a stagnant gas pocket that can result in localized drying out of the membrane; and/or reducing or minimizing significant pressure fluctuations due to slug or plug flow at the cell outlets.

Due to large gas volumes, static gas pockets can form on the electrode or at the top of the cell. Providing high electrolyte flow rates and utilizing features that cause gas lift to create high local shear rates may help to minimize static gas pocket formation on the electrode. However, a high electrolyte flow rate coupled with large production of gas and large amounts of electrolyte solution entering and exiting the cell presents significant challenges associated with slug and plug flow. This type of flow can be reduced or minimized by using a specified manifold and the outlet tube configuration, described in more detail below.

In some examples, a pan assembly can be used on the anode or the cathode side of the electrolyzer cell 100. The pan assembly can include an effective collection system at the top of the cell to minimize and in some cases prevent the formation of large stagnant gas pockets at the top of the cell. In an example, the collection system comprises a manifold and an outlet tube with large cross-sectional area that effectively provides space for gas to collect as well as electrolyte to flow while also reducing or minimizing the likelihood of masking of the membrane and/or slug or plug flow. The pan assembly can provide for two phase (gas/liquid) flow that is effectively directed out of the cell.

The pan assembly, manifold, and outlet tube are designed to ensure that flow is uniform or substantially across the width of the cell, and that pressure fluctuations within the cell is minimal. The flow uniformity drives the need to ensure that the back pressure associated with the flow's entry into the manifold is significantly greater than the pressure drop along the length of the manifold and so that the pressure within the manifold is greater than the pressure drop exiting the manifold. Maintaining an essentially constant internal pressure distribution drives the requirement to avoid slug or plug flow through the manifold and the outlet tubing. Therefore, the pan assembly comprising the manifold and the outlet tube can provide for reliable cell operation across a high range of electrolyte flows and high current densities.

As the current density is increased in the cell, power dissipation can also rise dramatically. Large spatial and/or temporal temperature fluctuations can damage the membrane. The contribution of internal power dissipation to the cell's internal temperature distribution can be reduced or minimized through operating conditions such as the maintaining temperature, flow rate of the inflowing electrolyte, and/or re-circulation of the inflowing electrolyte. High electrolyte flow rates can provide for a high amount of convective heat transfer within the cell, thereby helping to reduce or minimize the heat buildup and concomitant temperature rise within the cell that may otherwise result from an increase in current density. In an example, the pan assembly of the electrolyzer cell includes a baffle plate configuration inside the pan assembly that can reduce or minimize the impact of fluctuating power dissipation on the internal temperature of the cell by helping to ensure that the electrolyte remains isothermal or substantially isothermal along the height of the cell and so that thermal equilibrium is achieved rapidly after the operating current density is changed.

In the generic electrolyzer cell 100 described above with respect to FIG. 1, the anode half cell 111 can comprise an anode pan assembly that includes the anode 112 and the anode electrolyte (also referred to as "anolyte"). Similarly, the cathode half cell 121 can comprise a cathode pan assembly that includes the cathode 122 and the cathode electrolyte (also referred to as "catholyte"). The anode pan assembly and the cathode pan assembly can be separated by the separator 131 (e.g., a diaphragm, a membrane electrode assembly (MEA), one or more ion exchange membranes (IEM), or another type of membrane or separator). The anode pan assembly and/or the cathode pan assembly can include components, such as a collection system that collects the gas and the electrolyte for flow out of the cell 100. A separator assembly can include one or more of an anion exchange membrane (AEM), a cation exchange membrane (CEM), or another separator depending on the desired reactions at the anode 112 and the cathode 122. In between these components, various additional separator components can be provided, e.g., to separate the membrane 131 from the anode 112, to separate the membrane 131 from the cathode 122, as well as provide mechanical integrity to the membranes or other separator structures. In addition to these components, individual gaskets or gasket tape may be provided in between and along the outer perimeter of the components to seal the compartments from fluid leakage.

In an example, all of the components described above are aligned parallel or substantially parallel to each other and optional peripheral bolting may be provided to stack them together in the electrochemical cell 100. In a filter press configuration, no peripheral bolting may be required. In a stack of electrochemical cells, the anode 112 of one electrochemical cell 100 can be electrically connected with the cathode 122 of an adjacent electrochemical cell. The current passes through the stack of electrochemical cells during operation.

FIGS. 3-8 show several views of an example pan assembly 140 that can be used as the anode pan assembly for the anode half cell 111 or as the cathode pan assembly for the cathode half cell 121 in the electrolyzer cell 100 shown in FIG. 1 or in one of the individual electrolyzer cells 132 in the stack 130 of FIG. 2. FIG. 3 is a front view of the pan assembly 140 and FIG. 4 is a cross sectional view of the pan assembly 140. It is to be understood that in the electrochemical cell 100 or 132, the pan assembly 140 can be used as the anode pan assembly or as the cathode pan assembly, or both, depending on the need and the reaction at the anode 112 and the cathode 122. The next component of the cell such as the anode 112 or the cathode 122 can be placed on top of the pan assembly 140 shown the front view of FIG. 3.

Figure 5:
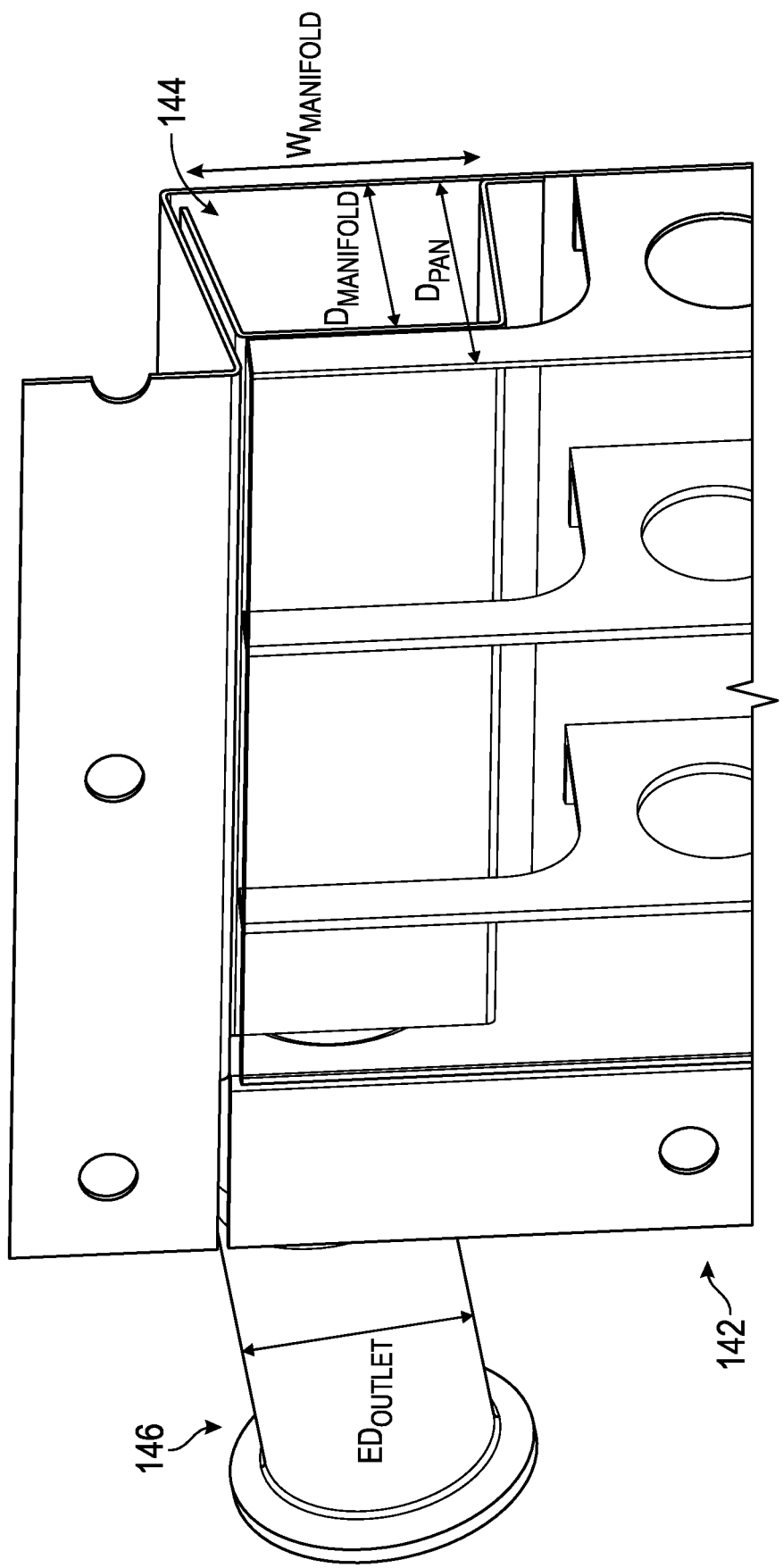
FIG. 5 is a close-up perspective view of a top portion of the example pan assembly of FIGS. 3 and 4, showing a manifold of the pan assembly.
Figure 6:
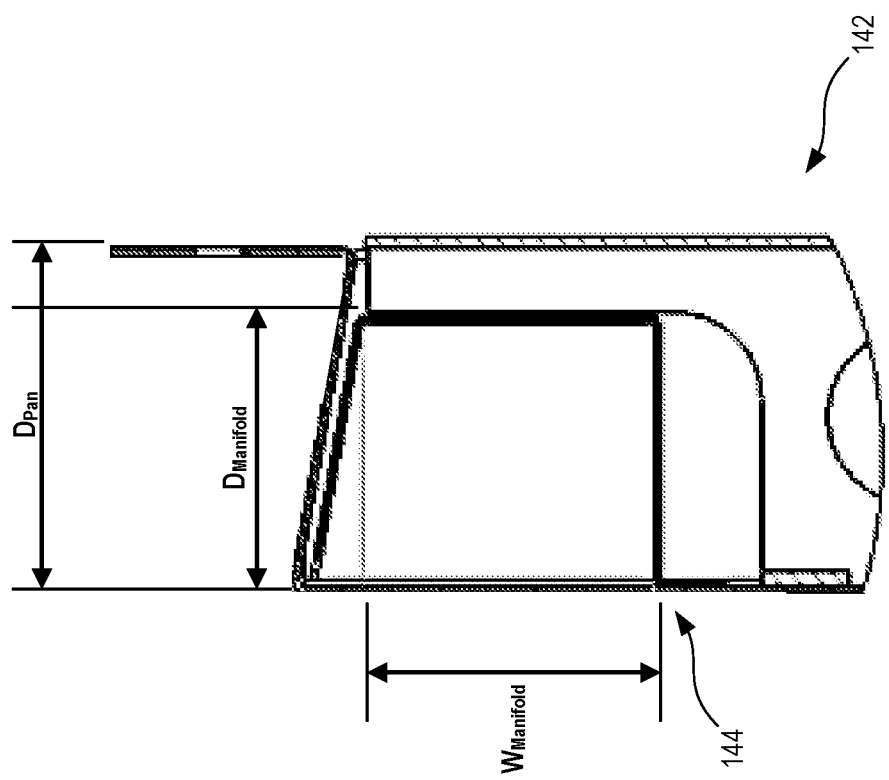
FIG. 6 is a close-up side view of the manifold of the example pan assembly of FIGS. 3 and 4.

As illustrated in FIGS. 3 and 4, the pan assembly 140 includes a pan 142. Inside the depth of the pan 142 and at the top of the pan 142 is housed a manifold 144 (shown in FIG. 4). The manifold 144 can be connected to one or more outlet tubes 146 depending on the requirements for the electrolyzer cell 100. For example, the design can incorporate 2, 3, 4, or more outlet tubes 146 on each pan assembly 140, on the same or either side of the pan 142 in order to minimize the cell thickness, and maximize the number of cells 100 that can fit in an electrolyzer frame of a particular size. FIGS. 5 and 6 show close-up details of the manifold 144 and the outlet tube 146.

In an example, a depth $D_{Manifold}$ of the manifold 144 and/or the cross sectional area of the manifold 144 and/or a size of the outlet tube 146 is selected so that the pan assembly 140 provides a relatively large cross sectional area of the manifold 144 in order to reduce or minimize the occurrence of slug and plug flow of the two phase system, but also to provide enough space between a wall of the manifold 144 and the electrode placed on top of the pan 142 (e.g., the anode or the cathode depending on whether the pan assembly 140 forms an anode pan or a cathode pan) for the gas and electrolyte to have an unimpeded flow and for the membrane to stay wetted. The depth $D_{Manifold}$ of the manifold 144 and/or the cross sectional area of the manifold 144 and/or a size of the outlet tube 146 can also dictate the overall thickness of the cell 100.

In an example of the pan assembly 140, the manifold 144 has a depth $D_{Manifold}$ (shown in FIGS. 5 and 6) that is from about 0.25 (25%) to about 0.75 (75%) of a depth $D_{Pan}$ of the pan 142, for example from about 0.25 (25%) to about 0.6 (60%) of the depth $D_{Pan}$, such as from about 0.25 (25%) to about 0.5 (50%) of the depth $D_{Pan}$ of the pan 142, for example from about 0.25 (25%) to about 0.4 (40%) of the depth $D_{Pan}$ of the pan 142, such as from about 0.25 (25%) to about 0.3 (30%) of the depth $D_{Pan}$ of the pan 142, for example from about 0.3 (30%) to about 0.75 (75%) of the depth $D_{Pan}$ of the pan 142, such as from about 0.3 (30%) to about 0.6 (60%) of the depth $D_{Pan}$ of the pan 142, for example from about 0.3 (30%) to about 0.5 (50%) of the depth $D_{Pan}$ of the pan 142, such as from about 0.3 (30%) to about 0.4 (40%) of the depth $D_{Pan}$ of the pan 142, for example from about 0.4 (40%) to about 0.75 (75%) of the depth $D_{Pan}$ of the pan 142, such as from about 0.4 (40%) to about 0.6 (60%) of the depth $D_{Pan}$ of the pan 142, for example from about 0.4 (40%) to about 0.5 (50%) of the depth $D_{Pan}$ of the pan 142, such as from about 0.5 (50%) to about 0.75 (75%) of the depth $D_{Pan}$ of the pan 142, for example from about 0.5 (50%) to about 0.6 (60%) of the depth $D_{Pan}$ of the pan 142, such as from about 0.6 (60%) to about 0.75 (75%) of the depth $D_{Pan}$ of the pan 142.

In an example, the manifold 144 has an upward taper at the top (best seen in FIG. 6). The upward taper creates an internal volume or zone above the upper edge of the membrane 131 positioned next to the electrode, providing a small region for a gas-rich mixture to form without resulting in the drying out of the membrane 131.

Figure 8:
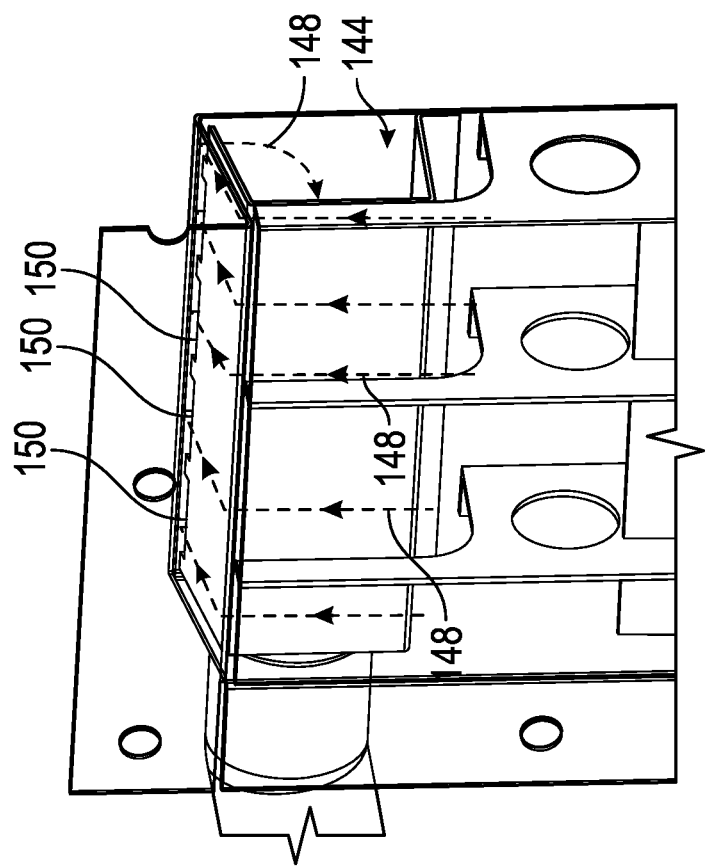
FIG. 8 is a second perspective view that conceptually shows the flow of electrolyte into the manifold of the example pan assembly of FIGS. 3 and 4.
Figure 7:
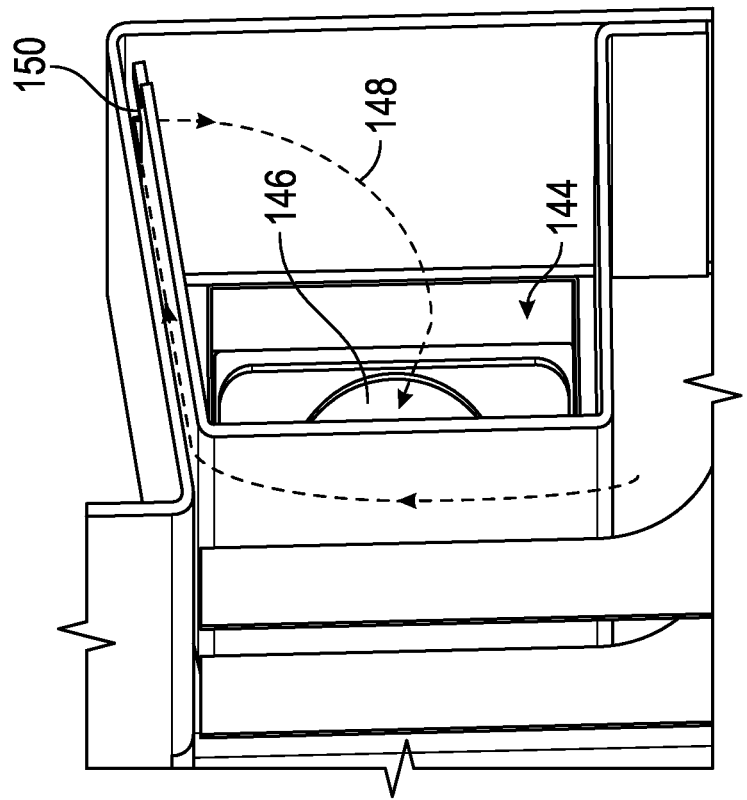
FIG. 7 is a first perspective view that conceptually shows the flow of electrolyte into the manifold of the example pan assembly of FIGS. 3 and 4.

An example flow path for the gas and electrolyte mixture through the pan assembly 140 is shown by the dotted line 148 in FIGS. 7 and 8. As can be seen in FIGS. 7 and 8, in an example, the flow path 148 of the two phases of the gas and the electrolyte passes upwards from the main part of the pan 142 to the top of the manifold 144 and then down into the manifold 144 through a set of notches 150 at the top of the manifold 144. The gas and the electrolyte can then flow out through the outlet tube 146.

In order to accommodate a large amount of the gas and the electrolyte solution flowing though the manifold 144 and the outlet tube 146, e.g., due to high current densities and high flow rates, and to reduce or minimize the occurrence of slug and plug flow, in an example, the cross sectional area of the manifold 144 and the outlet tube 146 is large enough to maintain the superficial liquid velocity of the electrolyte to be about 0.35 m/s or less, for example about 0.25 m/s or less, such as about 0.2 m/s or less, for example about 0.15 m/s or less, such as about 0.1 m/s or less, for example about 0.08 m/s or less, such as about 0.05 m/s or less, for example about 0.01 m/s or less. The cross sectional area of the manifold 144 and the outlet tube 146 is large enough to maintain a superficial gas velocity (e.g., $O_2$ gas from an anode pan or $H_2$ gas produced from the cathode pan) to be about 5 m/s or less, for example about 4.5 m/s or less, such as about 4 m/s or less, for example about 3.5 m/s or less, such as about 3 m/s or less, for example about 2.5 m/s or less, such as about 2 m/s or less, for example about 1.5 m/s or less, such as about 1 m/s or less.

In order to accommodate the high current densities and the high flow rates as noted herein, in some examples, the cross sectional area of the manifold 144 (e.g. comprising the depth $D_{Manifold}$ of the manifold 144 of from about 0.25 (25%) to about 0.75 (75%) of the depth $D_{Pan}$ of the pan 142) is from about 520 square millimeters ($mm^2$) to about 6200 $mm^2$, for example from about 520 $mm^2$ to about 6000 $mm^2$, such as from about 520 $mm^2$ to about 5000 $mm^2$, for example from about 520 $mm^2$ to about 4000 $mm^2$, such as from about 520 $mm^2$ to about 3000 $mm^2$, for example from about 520 $mm^2$ to about 2000 $mm^2$, such as from about 520 $mm^2$ to about 1000 $mm^2$, for example from about 600 $mm^2$ to about 6200 $mm^2$, such as from about 600 $mm^2$ to about 6000 $mm^2$, for example from about 600 $mm^2$ to about 5000 $mm^2$, such as from about 600 $mm^2$ to about 4000 $mm^2$, for example from about 600 $mm^2$ to about 3000 $mm^2$, such as from about 600 $mm^2$ to about 2000 $mm^2$, for example from about 600 $mm^2$ to about 1000 $mm^2$, such as from about 800 $mm^2$ to about 6200 $mm^2$, for example from about 800 $mm^2$ to about 6000 $mm^2$, such as from about 800 $mm^2$ to about 5000 $mm^2$, for example from about 800 $mm^2$ to about 4000 $mm^2$, such as from about 800 $mm^2$ to about 3000 $mm^2$, for example from about 800 $mm^2$ to about 2000 $mm^2$, such as from about 800 $mm^2$ to about 1000 $mm^2$, for example from about 1000 $mm^2$ to about 6200 $mm^2$, such as from about 1000 $mm^2$ to about 6000 $mm^2$, for example from about 1000 $mm^2$ to about 5000 $mm^2$, such as from about 1000 $mm^2$ to about 4000 $mm^2$, for example from about 1000 $mm^2$ to about 3000 $mm^2$, such as from about 1000 $mm^2$ to about 2000 $mm^2$, for example from about 2000 $mm^2$ to about 6200 $mm^2$, such as from about 2000 $mm^2$ to about 6000 $mm^2$, for example from about 2000 $mm^2$ to about 5000 $mm^2$, such as from about 2000 $mm^2$ to about 4000 $mm^2$, for example from about 2000 $mm^2$ to about 3000 $mm^2$, such as from about 3000 $mm^2$ to about 6200 $mm^2$, for example from about 3000 $mm^2$ to about 6000 $mm^2$, such as from about 3000 $mm^2$ to about 5000 $mm^2$, for example from about 3000 $mm^2$ to about 4000 $mm^2$, such as from about 4000 $mm^2$ to about 62000 $mm^2$, for example from about 4000 $mm^2$ to about 6000 $mm^2$, such as from about 4000 $mm^2$ to about 5000 $mm^2$, for example from about 5000 $mm^2$ to about 6200 $mm^2$, such as from about 5000 $mm^2$ to about 6000 $mm^2$.

In some examples wherein the cross-sectional area of the manifold 144 is as recited above, the outlet tube 146 fluidly connected to the manifold 144 can have an equivalent diameter $ED_{Outlet}$ (shown in FIG. 5) is from about 26 millimeters (mm) to about 89 mm, for example from about 26 mm to about 80 mm, such as from about 26 mm to about 75 mm, for example from about 26 mm to about 70 mm, such as from about 26 mm to about 60 mm, for example from about 26 mm to about 50 mm, such as from about 26 mm to about 40 mm, for example from about 26 mm to about 30 mm, such as from about 30 mm to about 89 mm, for example from about 30 mm to about 80 mm, such as from about 30 mm to about 75 mm, for example from about 30 mm to about 70 mm, such as from about 30 mm to about 60 mm, for example from about 30 mm to about 50 mm, such as from about 30 mm to about 40 mm, for example from about 40 mm to about 89 mm, such as from about 40 mm to about 80 mm, for example from about 40 mm to about 75 mm, such as from about 40 mm to about 70 mm, for example from about 40 mm to about 60 mm, such as from about 40 mm to about 50 mm, for example from about 50 mm to about 89 mm, such as from about 50 mm to about 80 mm, for example from about 50 mm to about 75 mm, such as from about 50 mm to about 70 mm, for example from about 50 mm to about 60 mm, such as from about 60 mm to about 89 mm, for example from about 60 mm to about 80 mm, such as from about 60 mm to about 75 mm, for example from about 70 mm to about 89 mm, such as from about 70 mm to about 80 mm, for example from about 70 mm to about 75 mm.

Those having skill in the art will appreciate that what may be considered a "high electrolyte flow rate" may be in comparison to the size of the electrochemical cell 100. For example, a "high flow rate" for a relatively narrow cell, e.g., from about 300 mm to about 600 mm wide, may correspond to a flow rate of about 200 kg/h, while a "high flow rate" for a large commercial size cell, e.g., from about 2 meters (m) to about 3 m wide, may correspond to a flow rate of about 800 kg/h or more, for example about 1000 kg/h or more, such as about 1350 kg/h or more, for example about 1500 kg/h or more, such as about 1750 kg/h or more, for example about 2000 kg/h or more, such as about 2250 kg/h or more, for example about 2500 kg/h or more, such as about 2700 kg/h or more. The cross sectional area of the manifold 144, the cross sectional area of the outlet tube 146, and/or the baffle assembly can accommodate high electrolyte flow rates and high gas flow rates associated with operation at high current densities as described herein and provide for a superficial liquid velocity that is about 0.2 m/s or less and a gas flow rate that is about 3 m/s or less so that slug and plug flow are unlikely to develop.

In some examples, the pan assembly can include a baffle assembly inside the pan assembly, wherein the baffle assembly can reduce or minimize the impact of high current density and/or fluctuating power dissipation on the internal temperature profile along the height of the electrolyzer cell. The baffle assembly can be suspended in the pan assembly, for example between a back pan wall and the electrode. In an example, the baffle assembly includes one or more ribs inside the pan. The one or more ribs can include one or more notches. A baffle plate comprising one or more slots can be included and configured to fit onto the one or more ribs such that a corresponding structure of the baffle plate can fit into the one or more notches of the one or more ribs.

FIGS. 9-15 show several views of a pan assembly 160 that includes an example baffle assembly 162. Similar to the pan assembly 140 described above with respect to FIGS. 3-8, the pan assembly 160 can be used as the structure for one or both of the anode half cell 111 and the cathode half cell 121 in the electrolyzer cell 100 of FIG. 1. For example, if the pan assembly 160 is used to form part of the anode half cell 111, then the pan assembly 160 can be an anode pan assembly. Similarly, if the pan assembly 160 is used to form part of the cathode half cell 121, then the pan assembly 160 can be a cathode pan assembly. Like the pan assembly 140, the pan assembly 160 includes a pan 164 (e.g., an anode pan and/or a cathode pan) and an outlet tube 166. The pan assembly 160 can also include a manifold 168 through which electrolyte and produced gas can flow before exiting the pan assembly 160 through the outlet tube 166, which can be similar or identical to the manifold 144 described above with respect to the pan assembly 140. In other words, the pan assembly that forms either the anode assembly or the cathode assembly, or both, can include features of both the pan assembly 140 described above with respect to FIGS. 3-8 and of the pan assembly 160 described below.

In an example, the baffle assembly 162 of the pan assembly 160 includes a baffle plate 170 that is fitted within the pan 162. In an example, the baffle plate 170 comprises one or more slots 172 (best seen in FIG. 10). Each slot 172 can interact with a corresponding rib 174 (shown in FIGS. 9, 11, and 12), wherein the one or more ribs 174 and the baffle plate 170 form the baffle assembly 162. The baffle plate 170 can have any number of slots 172 depending on the number of ribs 174 in the baffle assembly 162. The number of slots can be e.g., from 1 to about 200 in the baffle plate 170. The baffle plate 170 can be fitted over the ribs 174 in the pan 164. In an example, the one or more ribs 174 are perpendicular or substantially perpendicular to the baffle plate 170 and to the overall orientation of the pan 164. In other words, in an example, the baffle plate 170 is parallel or substantially parallel to a major surface of the pan 164, such as a back wall 178 of the pan 164. The electrode 176 associated with the pan assembly 160 (e.g., the anode 112 if the pan assembly 160 is an anode pan assembly or the cathode 122 if the pan assembly 160 is a cathode pan assembly) can be attached to the top of the pan assembly 160, e.g., on a side of the baffle assembly 162 that is opposite the back wall 178 of the pan 164.

Figure 9:
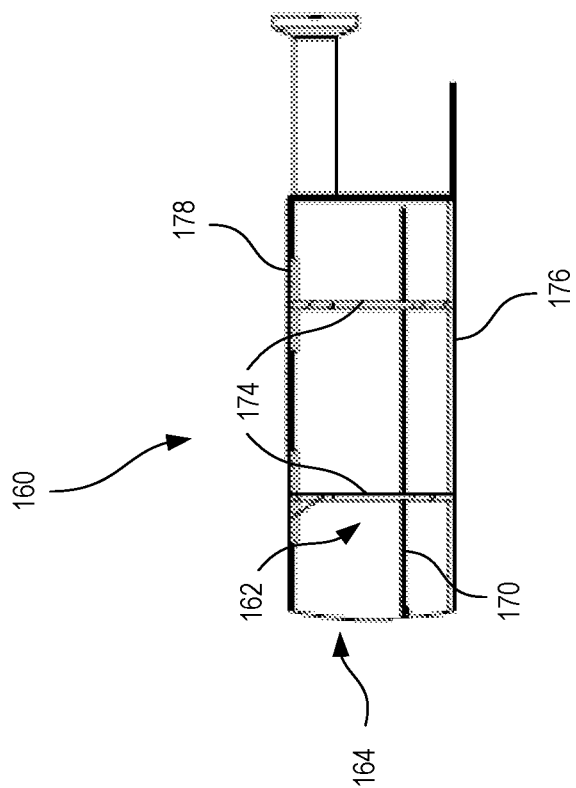
FIG. 9 is a side view of a second example pan assembly that can form an anode half cell, a cathode half cell, or both, in an electrolyzer cell.

In an example, each of the one or more ribs 174 can include one or more structures to position the baffle plate 170 relative to the pan 164 and/or relative to the electrode 176. In an example, these structures include one or more notches on each rib 174, wherein each notch slidably engages with a corresponding slot 172 on the baffle plate 170 in order to position the baffle plate 170 relative to the pan 164, e.g., so that the baffle plate 170 is suspended at a specified location relative to the electrode 176 and/or relative to the back wall 178 of the pan 164, as can be seen in FIGS. 9, 11, and 12. The notches in the ribs 174 are not visible in the Figures because the notches have been filled with the baffle plate 170. The distance of the baffle plate 170 from the electrode 176 and from the back wall 178 of the pan 164 can be changed by modifying the depth of the notches along the ribs 174.

Figure 10:
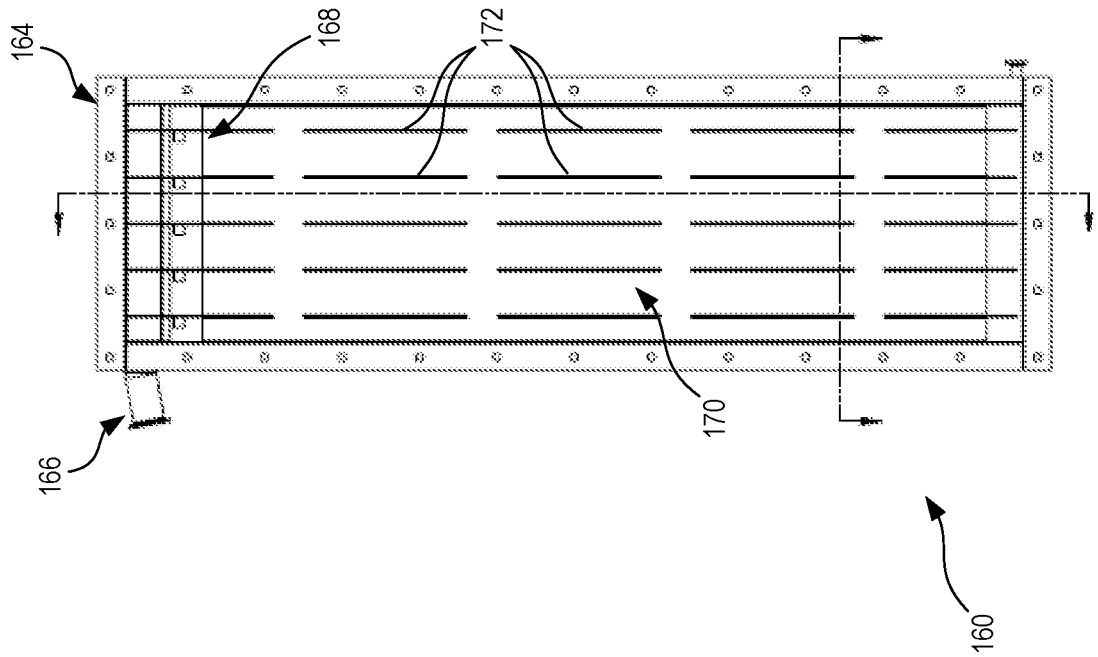
FIG. 10 is a front view of the second example pan assembly of FIG. 9.

The positioning of the slots 172 in the baffle plate 170, the length of the slots 172, and/or the distance between the slots 172 can affect the fitting of the baffle plate 170 onto the one or more ribs 174. In an example, the baffle plate 170 is a solid plate with the slots 172 formed therein, as best seen in FIG. 10. In other examples, the baffle plate can be an expanded metal plate or a mesh. In an example, the baffle plate 170 is made from a conductive metal, such as, but not limited to, nickel, stainless steel, and the like. In another example, the baffle plate 170 is made from a polymeric material. In either case, the baffle plate 170 can be configured to snap into place using features on the ribs 174.

As described earlier, the contribution of internal power dissipation to the internal temperature distribution within the electrolyzer cell 100 can be reduced or minimized through operating conditions such as the temperature and flow rate of the electrolyte flowing through the half cells 111, 121 (e.g., through the pan assemblies 160 that form the half cells 111, 121). High electrolyte flow rates can increase and in some examples maximize the convective heat transfer within the electrolyzer cell 100, thereby helping to reduce or minimize heat buildup and the corresponding concomitant temperature rise within the cell 100 that could otherwise result from the high current densities described herein. As discussed above, operating at high electrolyte flow rates and high current densities can lead to slugging or plug flow at the cell outlet, which can result in pressure fluctuations that can shorten the lifetime of the membrane 131. The pan assemblies 140, 160 described herein with the manifold 144 and outlet configurations and/or the baffle assembly 162 are designed to reduce or minimize slug and plug flow. In particular, the baffle assembly 162 can provide for mixing of the electrolyte as it flows through the pan assembly 160 to enhance convective heat transfer within the electrolyte during electrolysis.

Figure 14:
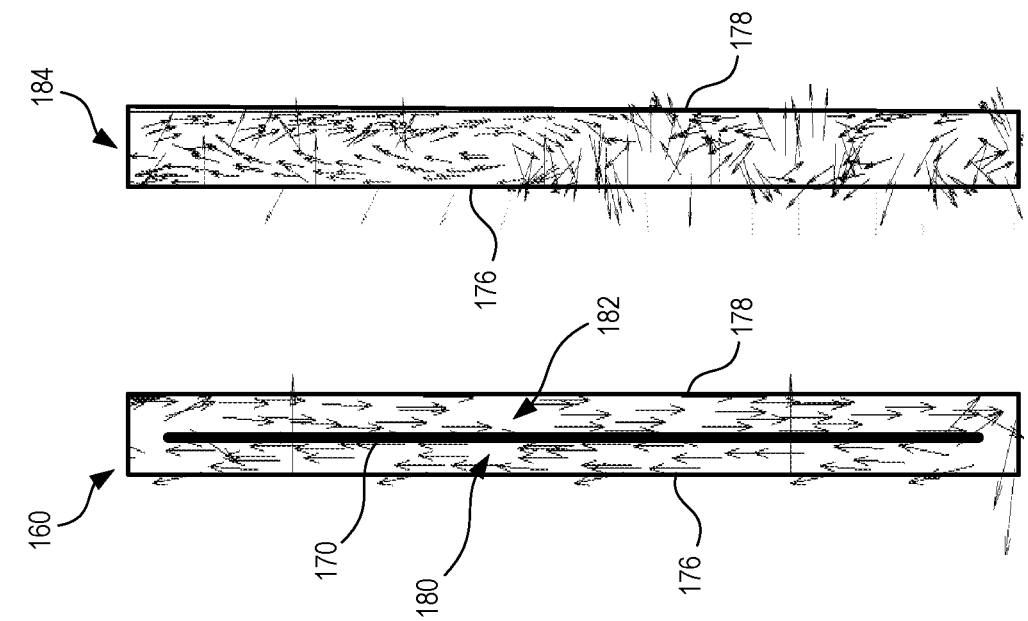
FIG. 14 is schematic side view showing a simulated flow distribution of electrolyte within the second example pan assembly of FIGS. 9 and 10 compared to a comparative flow distribution within the comparative pan assembly.

In some examples, the baffle assembly 162 is designed and positioned in such a way that the gas produced at the electrode 176 can mix with the electrolyte on the side of the baffle plate 170 closest to the electrode 176, resulting in a relatively low density column and defining a riser section. The low density mixture can rise relatively quickly through the riser section. Once above the top of the baffle plate 170, the gas can disengage and flow into the manifold 168 and then into the outlet tube 166. A fraction of the electrolyte may then drop back down the side of the baffle plate 170 closer to the back wall 178 (i.e., the side opposite to the electrode 176) of the pan 164 into a down-comer region, thereby creating a circulation loop. This circulation loop (with a riser section 180 on the side of the baffle plate 170 closer to the electrode 176 and a down-comer section 182 on the side of the baffle plate 170 opposite the electrode 176) that is formed in the pan assembly 160 is illustrated conceptually in FIG. 13, where it is compared to a comparative pan assembly 184 that does not include a baffle assembly, such as one with a baffle plate like the baffle plate 170, such that there is no resulting formation of a circulation pattern. FIG. 14 shows vector plots of a simulated flow distribution of electrolyte in the pan assembly 160 with the baffle plate 170 included (left side of FIG. 14) and a comparative pan assembly 184 without a baffle assembly (right side of FIG. 14). As can be seen in FIG. 14, without a baffle plate, the electrolyte solution rises slowly up though the comparative pan assembly 184. The gas evolved at the electrode 176 impacts the flow of the electrolyte, dragging some of the electrolyte up, and buffeting some of the electrolyte laterally. Gas lift is evident along the upper left wall (adjacent to the electrode 176) in the comparative pan assembly 184. While the comparative pan assembly 184 without the baffle plate does result in the formation of a weak circulation of electrolyte, the pan assembly 160 that includes the baffle plate 170 creates a strong circulation within the pan assembly 160. As is evident from FIG. 14, the flow in the riser section 180, e.g., the side of the baffle plate 170 closest to the electrode 176, is strongly oriented upward due to gas lift, and the flow on the down-comer section 182, e.g., the side of the baffle plate 170 closest to the back wall 178 of the pan assembly 160, is strongly oriented downward. The relatively high velocities and shear rates in the riser section 180 help sweep gas from the electrode 176, provide efficient top to bottom mixing within the pan assembly 160, and drive increased convective cooling.

The baffle assembly 162 can be used to create rapidly flowing circulation loops so that the electrolyte remains substantially isothermal as it flows through the pan assembly 160. Due to the high degree of top-bottom mixing and circulation, rapid thermal equilibration of the electrolyte can be achieved as it flows into and through the pan assembly 160. Another advantage is that relatively cold electrolyte can be introduced into the pan assembly 160 which can equilibrate with warm circulating electrolyte fluid. The circulation rate (or laps of the recirculation loop during electrolyte transit through the pan assembly 160) can be anywhere from 1 to 200. The high circulation rate can also drive larger shear rates adjacent to the membrane 131, helping to sweep gas away from the membrane 131 and/or enhance or maximize heat transfer from the membrane 131 to the electrode 176.

The positioning of the baffle plate 170 with respect to the electrode 176 as well as to the back wall 178 of the pan 164 and/or the width $W_{Baffle}$ and length $L_{Baffle}$ of the baffle plate 170 (shown in FIG. 15), can affect the velocity of the electrolyte through the riser section 180 as well as the down-comer section 182, thereby affecting the circulation rate of the electrolyte within the pan assembly 160. It has been found that if the baffle plate 170 is located farther than a specified critical distance from the electrode 176 then the circulation pattern of the riser section 180 and the down-comer section 182 may not be formed. Specifically, it has been found that when the gap between the baffle plate 170 and the electrode 176 is too large, free convection of the relatively light, gas-rich zone adjacent to the electrode 176 rises relatively rapidly compared to the slowly rising electrolyte farther away from the electrode 176. The resultant shear forces may drag up some of the electrolyte, which can then fall back down on the side of the baffle plate 170 closer to the electrode 176 as the gas disengages into the manifold 168 at the top of the pan assembly 160, resulting in a weak circulation forming on the side of the baffle plate 170 closest to the electrode 176. In such a configuration, the baffle plate 170 may not divide between a riser section and a down-comer section, and a strong circulation current may not form. If, on the other hand, the baffle plate 170 is too close to the electrode 176, then the space between the electrode 176 and the baffle plate 170 may fill with gas as the gas is formed at the electrode 176, choking off electrolyte flow in the space between the baffle plate 170 and the electrode 176. A high volume fraction of gas in the space between the baffle plate 170 and the electrode 176 can result in the membrane and/or the electrode 176 masking, and poor electrical and thermal transport.

Figure 13:
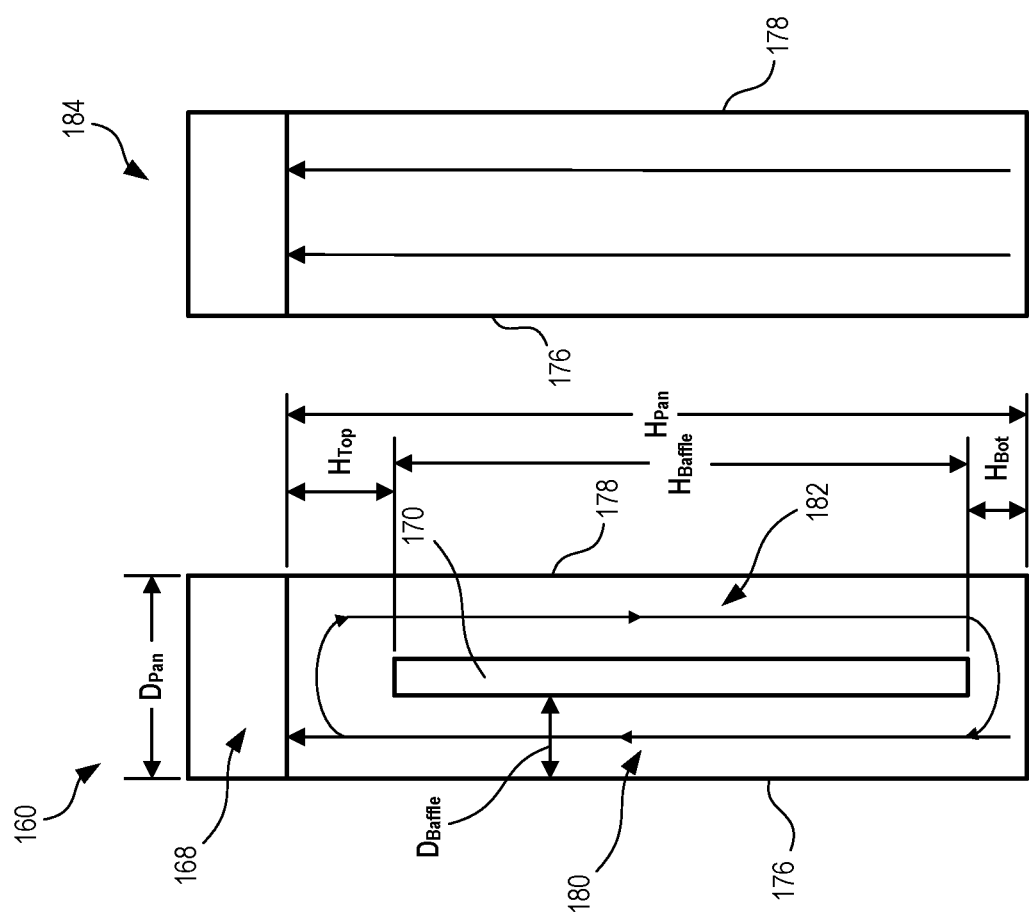
FIG. 13 is a cross-sectional side view of the second example pan assembly of FIGS. 9 and 10 and a corresponding cross-sectional side view of a comparative pan assembly that does not include a baffle assembly.
Figure 15:
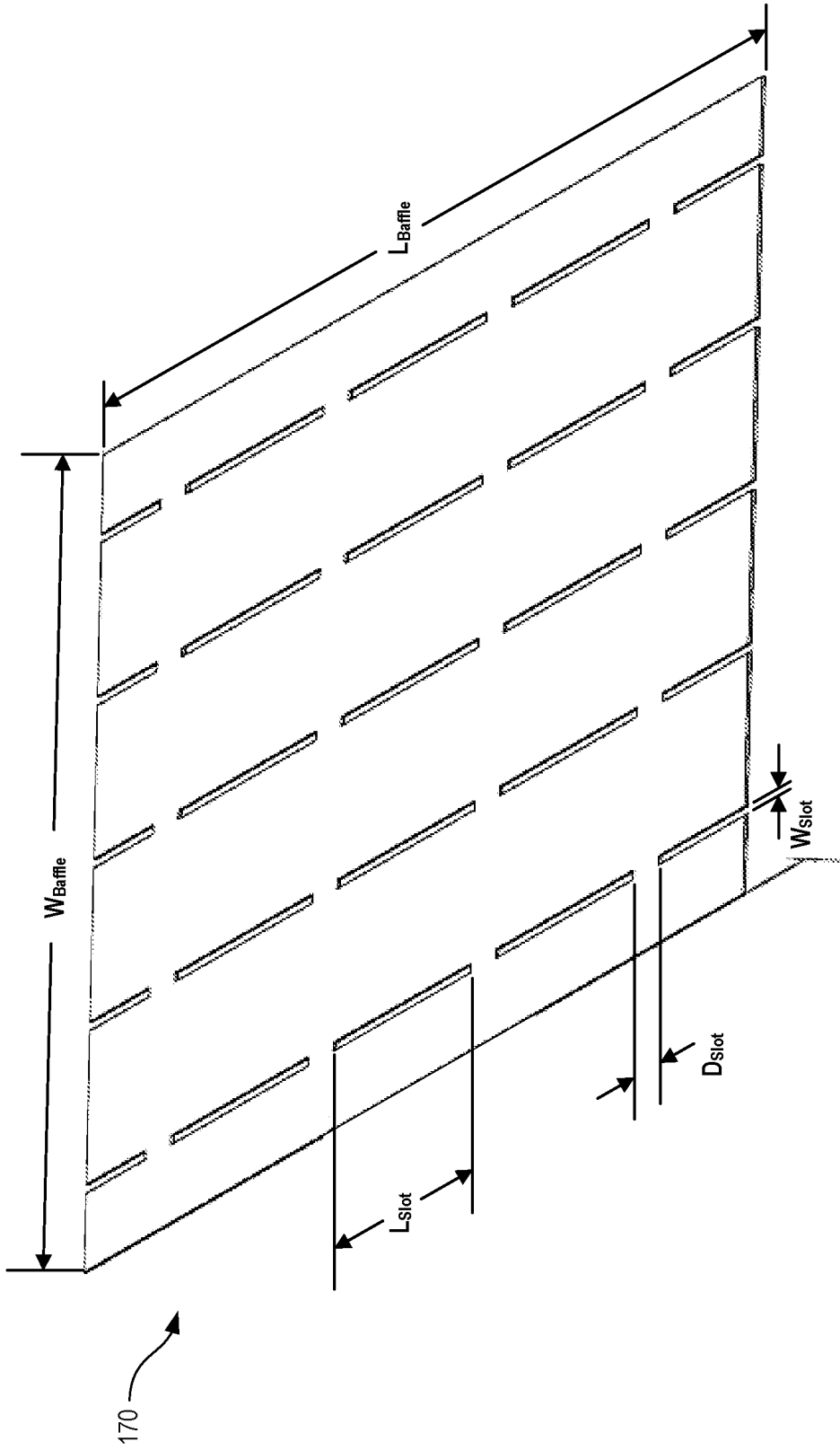
FIG. 15 is perspective view of a baffle plate that can form part of the baffle assembly in the second pan assembly of FIGS. 9 and 10.

The depth $D_{Pan}$ of the pan 164, the relative depth $D_{Baffle}$ of the baffle plate 170 relative to the electrode 176, the height $H_{Baffle}$ of the baffle plate 170 relative to the total height $H_{Pan}$ of the pan 164, and/or the vertical location of the baffle plate 170 within the pan 164 (e.g., as dictated by the vertical distance $H_{Top}$ from a top edge of the baffle plate 170 to a top wall of the pan 164 and the corresponding vertical distance $H_{Bot}$ from a bottom edge of the baffle plate 170 to a bottom wall of the pan 164), as illustrated in FIG. 13, can impact the circulation pattern of the electrolyte within the pan 164.

In an example, the distance of the baffle plate 170 from the electrode 176 (i.e., the relative depth $D_{Baffle}$ of the baffle as illustrated in FIG. 13) is from about 5 mm to about 25 mm, for example from about 5 mm to about 15 mm, such as from about 5 mm to about 12 mm, for example from about 5 mm to about 10 mm, such as from about 5 mm to about 8 mm, for example from about 5 mm to about 6 mm, for example from about 6 mm to about 25 mm, such as from about 6 nm to about 15 mm, for example from about 6 mm to about 12 mm, such as from about 6 mm to about 10 mm, for example from about 6 mm to about 8 mm, for example from about 8 mm to about 25 mm, such as from about 8 mm to about 15 mm, for example from about 8 mm to about 12 mm, for example from about 8 mm to about 10 mm, for example from about 10 mm to about 25 mm, such as from about 10 mm to about 15 mm, for example from about 10 mm to about 12 mm, such as from about 12 mm to about 25 mm, for example from about 12 mm to about 15 mm. In some examples, the distance $D_{Baffle}$ of the baffle plate 170 from the electrode 176 is equivalent to the depth of the notches on the ribs 174.

In an example, the distance $D_{Baffle}$ from the baffle plate 170 to the electrode 176 is at from about 0.25 (25%) to about 0.5 (50%) of the total depth $D_{Pan}$ of the pan 164, for example from about 0.25 (25%) to about 0.4 (40%) of the total depth $D_{Pan}$ of the pan 164, such as from about 0.25 (25%) to about 0.3 (30%) of the total depth $D_{Pan}$ of the pan 164, for example from about 0.3 (30%) to about 0.5 (50%) of the total depth $D_{Pan}$ of the pan 164, such as from about 0.4 (40%) to about 0.5 (50%) of the total depth $D_{Pan}$ of pan 164.

In an example, the height $H_{Baffle}$ and the positioning of the baffle plate 170 is such that it leaves space at the top ($H_{Top}$ in FIG. 13) and/or a space at the bottom ($H_{Bot}$ in FIG. 13) of the pan 164 for gas and liquid flow. In some examples where the manifold 168 and the baffle plate 170 both are present in the pan assembly 160, depending on the depth of the manifold 168 and the placement of the baffle plate 170 with respect to the depth $D_{Pan}$ of the pan 164, the baffle plate 170 may run behind the manifold 168 (e.g., between the manifold 168 and the electrode 176) towards the top of the pan 164 or the baffle plate 170 may end below the manifold 168. In either case, there can be a space between the baffle plate 170 and the top and/or bottom of the pan 164 for gas and liquid flow.

In an example, the space $H_{Bot}$ between a bottom edge of the baffle plate 170 and the bottom wall of the pan 164 is from about 6 mm to about 75 mm, for example from about 6 mm to about 65 mm, such as from about 6 mm to about 50 mm, for example from about 6 mm to about 40 mm, such as from about 6 mm to about 30 mm, for example from about 6 mm to about 20 mm, such as from about 6 mm to about 10 mm, for example from about 10 mm to about 75 mm, such as from about 10 mm to about 65 mm, for example from about 10 mm to about 50 mm, such as from about 10 mm to about 40 mm, for example from about 10 mm to about 30 mm, such as from about 10 mm to about 20 mm, for example from about 10 mm to about 15 mm, such as from about 20 mm to about 75 mm, for example from about 20 mm to about 65 mm, such as from about 20 mm to about 50 mm, for example from about 20 mm to about 40 mm, such as from about 20 mm to about 30 mm, for example from about 30 mm to about 75 mm, such as from about 30 mm to about 65 mm, for example from about 30 mm to about 50 mm, such as from about 30 mm to about 40 mm, for example from about 40 mm to about 75 mm, such as from about 40 mm to about 65 mm, for example from about 50 mm to about 75 mm, such as from about 50 mm to about 65 mm, for example from about 60 mm to about 75 mm.

In some embodiments, the space $H_{Top}$ between a top edge of the baffle plate 170 and the top wall of the pan 164 or the bottom of the manifold 168 is between about 6 mm to about 150 mm, for example from about 6 mm to about 140 mm, such as from about 6 mm to about 130 mm, for example from about 6 mm to about 120 mm, such as from about 6 mm to about 110 mm, for example from about 6 mm to about 100 mm, such as from about 6 mm to about 80 mm, for example from about 6 mm to about 70 mm, such as from about 6 mm to about 50 mm, for example from about 6 mm to about 25 mm, such as from about 10 mm to about 150 mm, for example from about 10 mm to about 140 mm, such as from about 10 mm to about 130 mm, for example from about 10 mm to about 120 mm, such as from about 10 mm to about 110 mm, for example from about 10 mm to about 100 mm, such as from about 10 mm to about 80 mm, for example from about 10 mm to about 70 mm, such as from about 10 mm to about 50 mm, for example from about 10 mm to about 25 mm, such as from about 25 mm to about 150 mm, for example from about 25 mm to about 140 mm, such as from about 25 mm to about 130 mm, for example from about 25 mm to about 120 mm, such as from about 25 mm to about 110 mm, for example from about 25 mm to about 100 mm, such as from about 25 mm to about 80 mm, for example from about 25 mm to about 70 mm, such as from about 25 mm to about 50 mm, for example from about 50 mm to about 150 mm, such as from about 50 mm to about 140 mm, for example from about 50 mm to about 130 mm, such as from about 50 mm to about 120 mm, for example from about 50 mm to about 110 mm, such as from about 50 mm to about 100 mm, for example from about 50 mm to about 80 mm, such as from about 50 mm to about 70 mm, for example from about 100 mm to about 150 mm, such as from about 100 mm to about 140 mm, for example from about 100 mm to about 130 mm, such as from about 100 mm to about 120 mm, for example from about 125 mm to about 150 mm, such as from about 125 mm to about 140 mm, for example from about 130 mm to about 150 mm, such as from about 75 mm to about 120 mm. It is to be understood that any of aforementioned dimensions for the space between the baffle plate and bottom of the anode and/or the cathode pan and the dimensions for the space between the baffle plate and top of the anode and/or the cathode pan or the bottom of the manifold, may be combined in order to achieve the optimum circulation pattern of the electrolyte.

In some embodiments, the anode and/or the cathode pan assembly provided herein, with the aforementioned manifold and the outlet tube and/or the baffle assembly provide several advantages such as, but not limited to, accommodating the aforementioned high flow rate of analyte or catholyte and/or reducing or minimizing the incidence of slug or plug flow; reducing or minimizing large spatial and/or temporal temperature fluctuations; reducing or minimizing pressure fluctuations due to multiphase flow in the cell, e.g., to less than 0.5 psi; and/or reducing or minimizing membrane erosion and/or fatigue.

As noted above, operation of the electrolyzer cell at high current densities can result in significant challenges, such as, but not limited to, large amount of heat generated in the cell. In an electrolyzer cell producing a large amount of gas at high current densities, the gas/electrolyte mixture can have a lower specific heat, a lower density, and/or a lower thermal conductivity than the electrolyte alone. Therefore, the heat removal efficiency of the electrolyte can be reduced as the gas hold up increases. Local temperatures can then rise quickly if a gas pocket masks a region of the electrode. If a significant region of the electrode is masked, the unmasked region will have to work harder, increasing the local Joule heating. Local hot spots thus developed can damage the membrane. As the current density is increased in the cell, power dissipation can also rise dramatically. Large spatial and/or temporal temperature fluctuations can damage the membrane.

FIGS. 16-19 and 20A-20C show an illustrative example of a pan assembly 190 that can be used as the anode pan assembly for the anode half cell 111 or as the cathode pan assembly for the cathode half cell 121, or both, in the electrolyzer cell 100 shown in FIG. 1. The pan assembly 190 includes a plurality of ribs 194 with specified geometry and/or spacing, and/or via the use of one or more welds 196 that couple an electrode 198 of the pan assembly 190 to the ribs 194, wherein the welds 196 have a specified weld density and cross-sectional configuration to reduce or minimize power dissipation in order to improve temperature distribution during operation of the cell. The pan assembly 190 can also include features of the pan assembly 140 described above with respect to FIGS. 3-8 (e.g., a manifold and outlet tube through which electrolyte and produced gas can flow before exiting the pan assembly 190, which can be similar or identical to the manifold 144 and outlet tube 146 described above with respect to the pan assembly 140) and/or features of the pan assembly 160 described above with respect to FIGS. 9-15 (e.g., a baffle assembly, which can be similar or identical to the baffle assembly 162 described above with respect to the pan assembly 160). In other words, the pan assembly that forms either the anode assembly or the cathode assembly, or both, can include features of the pan assembly 140 described above with respect to FIGS. 3-8 and/or of the pan assembly 160 described above with respect to FIGS. 9-15 in addition to features of the pan assembly 190 described below.

The rib geometry, rib spacing, and/or weld density and cross-sectional configurations in the pan assembly 190 can reduce or minimize the effect of one or more of these challenges, such as, but not limited to, by more effectively distributing current across the pan assembly 190 to reduce the chance of hot spot formation, reduce or avoid large spatial and/or temporal temperature fluctuations of the electrolyte along the height of the pan assembly 190, and/or reduce or minimize membrane damage due to hot spots.

The design of the pan assembly 190 comprising the one or more ribs 194 and the welds 196, as described below, can provide for efficient current distribution across the active area of the cell when operating at high current densities. The cross-sectional area of the ribs 194 and the welds 196 can also allow the cells to be more effective for operational and economical purposes.

Similar to the pan assemblies 140 and 160 described above with respect to FIGS. 3-15, the pan assembly 190 can be used as the structure for one or both of the anode half cell 111 and the cathode half cell 121 in the electrolyzer cell 100 of FIG. 1, i.e., the pan assembly 190 can form the anode half cell 111 such that the pan assembly 190 is an anode pan assembly and/or the pan assembly 190 can form the cathode half cell 121 such that the pan assembly 190 is a cathode pan assembly. The pan 192 can include an interior for receiving an electrolyte (i.e., an anolyte if the pan assembly 190 is an anode pan assembly and a catholyte if the pan assembly 190 is a cathode pan assembly) and an electrode 198 (i.e., the anode 112 in an anode pan assembly 190 or the cathode 122 is a cathode pan assembly 190). The anode pan assembly and the cathode pan assembly can be separated by a separator (i.e., the membrane 131), which can be, for example, one or more of a diaphragm, a membrane electrode assembly (MEA), or an ion exchange membrane (IEM). The pan assembly 190 can further comprise components, such as a collection system (e.g., a manifold such as the manifold 144 or 168 described above) that collects the gas and the electrolyte for flow out of the pan assembly 190. Various additional separator components can be provided, e.g., to separate the one or more membranes from the anode, to separate the one or more membranes from the cathode, to separate one membrane from another membrane (e.g., to separate an anion exchange membrane (AEM) from a cation exchange membrane (CEM)), and/or to provide mechanical integrity to the one or more membranes. In addition to these components, individual gaskets or gasket tape may be provided in between and along the outer perimeter of the components to seal the compartments from fluid leakage.

Figure 17:
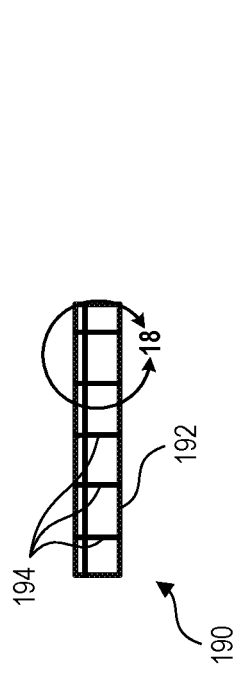
FIG. 17 is a cross-sectional side view of the third example pan assembly of FIG. 16.
Figure 18:
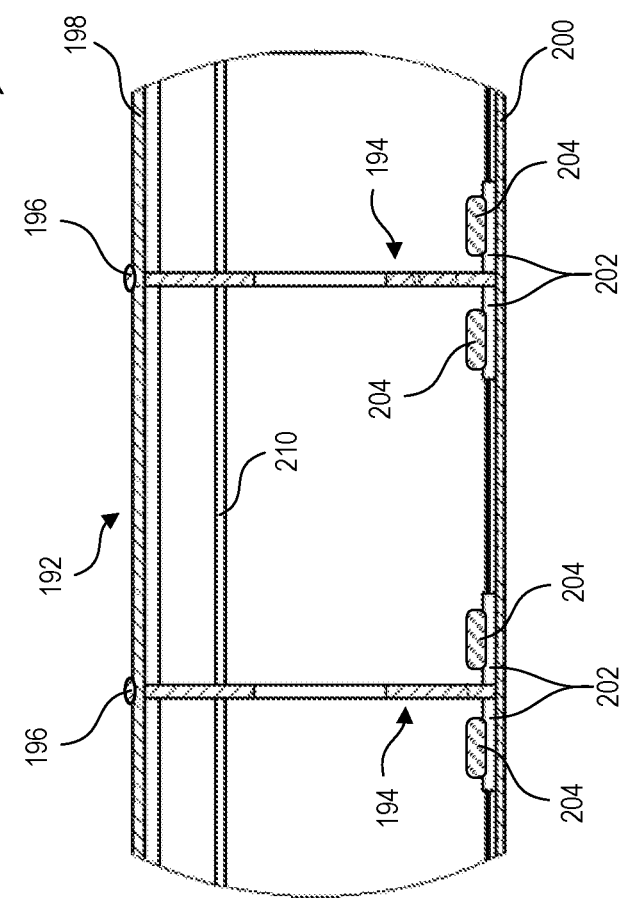
FIG. 18 is a close-up cross-sectional side view of the third example pan assembly of FIGS. 16 and 17.
Figure 16:
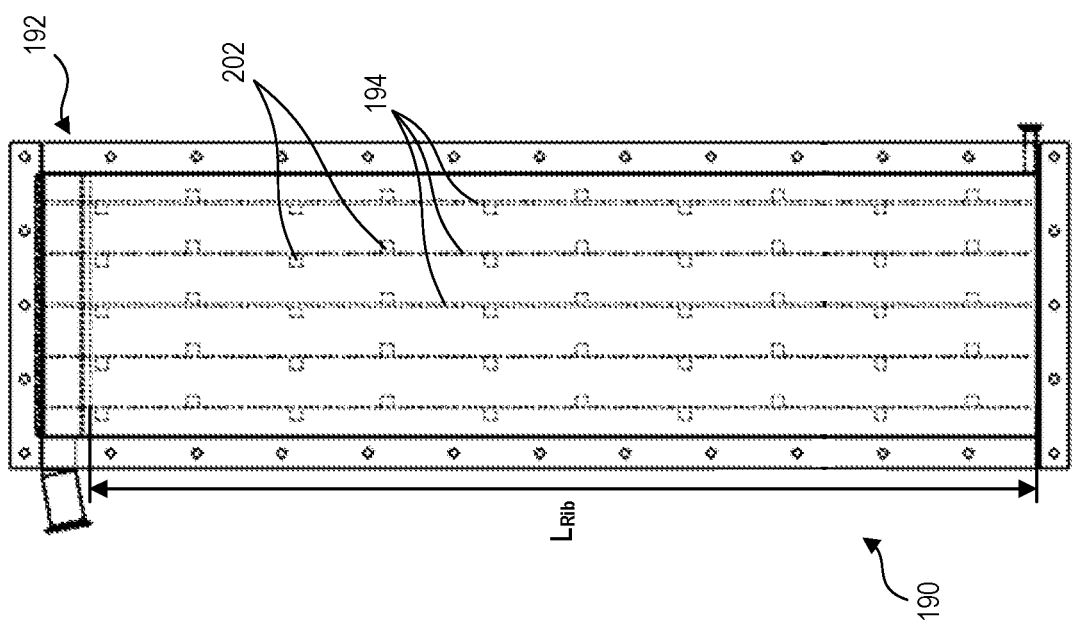
FIG. 16 is a front view of a third example pan assembly that can form an anode half cell, a cathode half cell, or both, in an electrolyzer cell.

In an example, the pan assembly 190 includes a pan 192, one or more ribs 194 positioned vertically inside the pan 192, an electrode 198 coupled to the one or more ribs 194, and one or more welds 196 that weld the electrode 198 to the one or more ribs 194. FIG. 16 is a front view of an illustrative example of the pan assembly 190, FIG. 17 is a side cross-sectional view of the pan assembly 190, and FIG. 18 is an enlarged view of the cross-section taken along line 18 in FIG. 17. The Figures show the one or more structures that can form the one or more ribs 194. As can be seen particularly in the view of FIG. 18, in an example, the one or more ribs 194 can be perpendicular or substantially perpendicular to a major dimension of the pan 192. For example, each of the one or more ribs 194 can be perpendicular or substantially perpendicular to one or more major faces of the pan 192, such as the electrode 198 or a back pan wall 200.

On top of the pan 192 and on top of the one or more ribs 194 can be placed the electrode 198. As can be seen, in an example, the electrode 198 can be welded to the one or more ribs 194 with one or more welds 196. In an example, each of the one or more ribs 194 is coupled to the back wall 200 of the pan 192 by one or more tabs 202 that are coupled to the back wall 200 with one or more tab welds 204.

In an example, the electrode 198 can be electrically coupled to the supplied electrical current via the one or more welds 196. During operation of a cell that uses the pan assembly 190 to form the cathode half cell, current flows into the cathode (e.g., the electrode 198 of the cathode pan assembly 190) through the welds 196 of the cathode pan assembly 190. Then, the current flows from the cathode 198 to the one or more ribs 194 of the cathode pan assembly 190. The current then flows through the one or more ribs 194 of the cathode pan assembly 190 through the tabs 202 and finally into a conductor contacting the pan 192 of the cathode pan assembly 190 (e.g., to the anode half cell of an adjacent cell or to a contact plate). During operation of a cell that uses the pan assembly 190 to form the anode half cell, current flows from a conductor contacting the pan 192 of the anode pan assembly 190 (e.g., from the cathode half cell of an adjacent cell or from a contact plate) to the ribs 194 of the anode pan assembly 190 through the tabs 202, then to the anode (e.g., the electrode 198 of the anode pan assembly 190), and then into a conductor that is electrically connected to one or more of the welds 196 of the anode pan assembly 190. As noted above, the one or more ribs 194 can be welded to the back wall 200 of the pan 192 via the tabs 202 and the tab welds 204. In an example, the tabs 202 set the spacing of the tab welds 204 between the bottom of the ribs 194 and the back wall 200 of the pan 192. Since the current flows between the back wall 200 of the pan 192 and the electrode 198 through the ribs 194, the tabs 202 can provide adequate weld cross-section between the ribs 194 and the pan 192. The tabs 202 can facilitate better current distribution across the active area and provide electrical contact between the ribs 194 and the pan 192. However, in other examples, the ribs 194 can be directly welded to the back wall 200 of the pan 192 and may not be connected through tabs.

Figure 19:
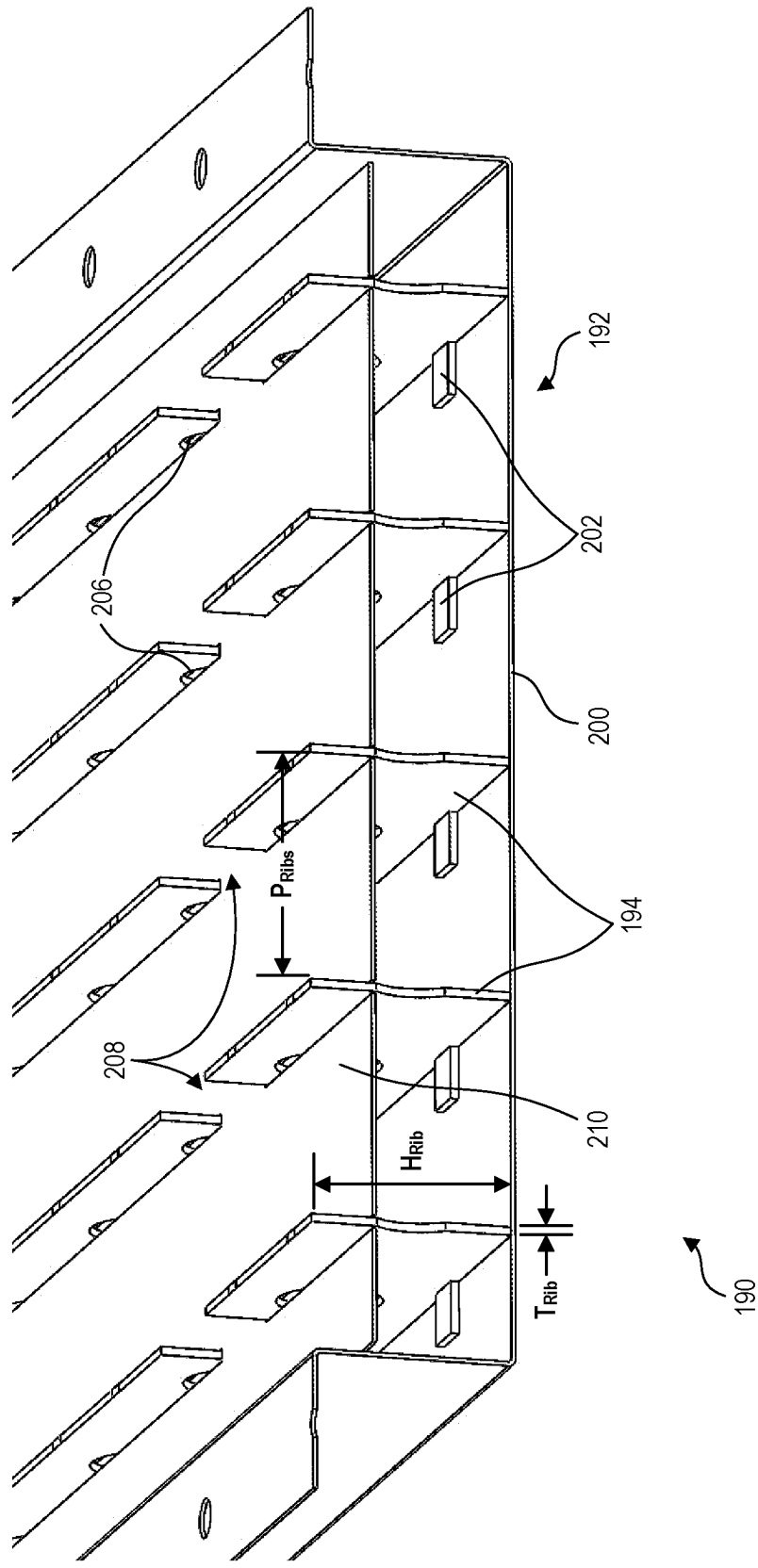
FIG. 19 is a perspective view of the third example pan assembly of FIGS. 16 and 17, which shows details of one or more ribs within the third example pan assembly.

The geometry and spacing of the one or more ribs 194 can dictate current flow through the pan assembly 190. The geometry of the ribs 194 can include, but not limited to, the number of the ribs 194, the height $H_{Rib}$ of the ribs 194, the physical design of the ribs 194, the pitch $P_{Ribs}$ between adjacent ribs 194, and/or the thickness $T_{Rib}$ of the ribs 194 (as shown in FIG. 19). As the current flows in through the welds 196, the geometry, spacing or density, and/or cross-sectional area of the welds 196 can also impact current flow through the pan assembly 190. As increasingly high currents flow through the cell, the density and the cross sectional area of the welds 196 can significantly impact the local Joule heating and avoid membrane damage from local hot spots. Provided herein are a unique geometry, spacing, and cross-sectional area of the ribs 194 as well as the welds 196 that can facilitate efficient operation of the electrochemical cell made up of one or two of the pan assemblies 190 at high current densities.

The physical configuration, i.e., the overall shape, of the one or more ribs 194 can be selected for one or more purposes. For example, one or more of the ribs 194 can be solid plates, such as solid plates of conductive metal, such as the example ribs 194A shown in FIG. 20A. In another example, the one or more ribs 194 can include one or more holes or openings that allow the electrolyte to move laterally within the pan 192, such as the one or more ribs 194B having holes 206 as shown in FIG. 20B. In an example, the one or more ribs 194 include one or more notches for receiving one or more other structures, such as the ribs 194C shown in FIG. 20C that include one or more notches 208 for receiving portions of a baffle plate 210 (which is described in more detail below). In an example, the one or more ribs 194 can include both holes 206 and notches 208, as with the ribs 194C shown in FIG. 20C, or can include only the holes 206 or only the notches 208.

The number of ribs 194 inside the pan 192 can impact the current distribution and the power dissipation within the pan assembly 190. In an example, the number of ribs 194 inside the pan 192 is from 1 to 75 of the ribs 194, such as from 1 to 60 of the ribs 194, for example from 1 to 50 of the ribs 194, such as from 1 to 40 of the ribs 194, for example from 1 to 30 of the ribs 194, such as from 1 to 20 of the ribs 194, such as from 1 to 10 of the ribs 194, for example from 1 to 5 of the ribs 194, such as from 5 to 75 of the ribs 194, for example from 5 to 60 of the ribs 194, such as from 5 to 50 of the ribs 194, for example from 5 to 40 of the ribs 194, such as from 5 to 30 of the ribs 194, for example from 5 to 20 of the ribs 194, such as from 5 to 10 of the ribs 194, for example from 10 to 75 of the ribs 194, such as from 10 to 60 of the ribs 194, for example from 10 to 50 of the ribs 194, such as from 10 to 40 of the ribs 194, for example from 10 to 30 of the ribs 194, such as from 10 to 20 of the ribs 194, for example from 20 to 75 of the ribs 194, such as from 20 to 60 of the ribs 194, for example from 20 to 50 of the ribs 194, such as from 20 to 40 of the ribs 194, for example from 20 to 30 of the ribs 194, such as from 30 to 75 of the ribs 194, for example from 30 to 60 of the ribs 194, such as from 30 to 50 of the ribs 194, for example from 30 to 40 of the ribs 194, such as from 40 to 75 of the ribs 194, for example from 40 to 60 of the ribs 194, such as from 40 to 50 of the ribs 194, for example from 50 to 75 of the ribs 194, such as from 50 to 60 of the ribs 194, for example from 60 to 75 of the ribs 194. For example, the pan assemblies 190 shown in FIGS. 16-19 and 20A-20C show the pan 192 containing five (5) ribs 194.

A cross-sectional perspective view of the exemplary pan assembly 190 is shown in FIG. 19. The electrode 198 and the welds 196 are not shown in FIG. 19. As described above, the pan assembly 190 includes one or more ribs 194 positioned vertically in the pan 192, e.g., the ribs 194 are coupled to the back wall 200 of the pan 192, such as with the tabs 202, and the ribs 194 extend from the back wall 200 toward the electrode. In FIG. 19, the pitch, or the distance between, two adjacent ribs 194 is labeled as $P_{Ribs}$, the height of the one or more ribs 194 is labeled as $H_{Rib}$, and the thickness of the one or more ribs 194 is labeled as $T_{Rib}$. The ribs 194 are shown in FIG. 19 as comprising holes 206 for the movement of the electrolyte as well as notches 208. The notches 208 facilitate fitting of specified sections of a baffle plate 210 into the space formed by the notches 208 in order to secure the baffle plate 210 to the one or more ribs 194. The baffle plate 210 can be similar or identical to the baffle plate 170 described above with respect to the pan assembly 160 of FIGS. 9-15. In an example, the one or more ribs 194 are made of a conductive metal, such as, but not limited to, nickel, stainless steel, etc.

It is to be understood that the holes 206 and the notches 208 may not be present, e.g., the ribs 194 can each be formed from a solid plate, such as the ribs 194A of FIG. 20A, or the ribs 194 can have notches 208 but not have holes 206, or the ribs 194 can have the holes 206 and not the notches 208. The holes 206, if present, need not be of any specific shape or size. For example, the holes 206 can be circular openings, slits, perforations, or a mesh.

In an example, the length $L_{Rib}$ of the one or more ribs 194 (FIG. 16) is from about 0.25 meters (m) to about 1.5 m, for example from about 0.25 m to about 1.2 m, such as from about 0.25 m to about 1 m, for example from about 0.25 m to about 0.8 m, such as from about 0.25 m to about 0.6 m, for example from about 0.25 m to about 0.5 m, such as from about 0.25 m to about 0.4 m, for example from about 0.25 m to about 0.3 m, such as from about 0.5 m to about 1.5 m, for example from about 0.5 m to about 1.2 m, such as from about 0.5 m to about 1 m, for example from about 0.5 m to about 0.8 m, such as from about 0.5 m to about 0.6 m, for example from about 0.6 m to about 1.5 m, such as from about 0.6 m to about 1.2 m, for example from about 0.6 m to about 1 m, such as from about 0.6 m to about 0.8 m, for example from about 0.7 m to about 1.5 m, such as from about 0.7 m to about 1.2 m, for example from about 0.7 m to about 1 m, such as from about 0.7 m to about 0.8 m, for example from about 0.8 m to about 1.5 m, such as from about 0.8 m to about 1.2 m, for example from about 0.8 m to about 1 m.

In an example, the length of the notch 208 in each of the one or more ribs 194 is from about 5 millimeters (mm) to about 100 mm, for example from about 5 mm to about 80 mm, such as from about 5 mm to about 60 mm, for example from about 5 mm to about 50 mm, such as from about 5 mm to about 40 mm, for example from about 5 mm to about 30 mm, such as from about 5 mm to about 20 mm, for example from about 5 mm to about 10 mm, such as from about 10 mm to about 100 mm, for example from about 10 mm to about 50 mm, such as from about 10 mm to about 40 mm, for example from about 10 mm to about 30 mm, such as from about 10 mm to about 20 mm, for example from about 20 mm to about 100 mm, such as from about 20 mm to about 50 mm, for example from about 20 mm to about 40 mm, such as from about 20 mm to about 30 mm, for example from about 30 mm to about 100 mm, such as from about 30 mm to about 50 mm, for example from about 30 mm to about 40 mm, such as from about 40 mm to about 100 mm, for example from about 40 mm to about 50 mm, such as from about 50 mm to about 100 mm, for example from about 75 mm to about 100 mm.

In an example, the thickness $T_{Rib}$ of the one or more ribs 194 is from about 1 mm to about 3 mm, for example from about 1 mm to about 2.5 mm, such as from about 1 mm to about 2 mm, for example from about 1 mm to about 1.5 mm, such as from about 2 mm to about 3 mm, for example from about 2 mm to about 2.5 mm, such as from about 2.5 mm to about 3 mm.

In an example, the height $H_{Rib}$ of the one or more ribs 194 is from about 10 mm to about 110 mm, for example from about 10 mm to about 100 mm, such as from about 10 mm to about 75 mm, for example from about 10 mm to about 70 mm, such as from about 10 mm to about 60 mm, for example from about 10 mm to about 50 mm, such as from about 10 mm to about 40 mm, for example from about 10 mm to about 30 mm, such as from about 20 mm to about 110 mm, for example from about 20 mm to about 75 mm, such as from about 20 mm to about 70 mm, for example from about 20 mm to about 60 mm, such as from about 20 mm to about 50 mm, for example from about 20 mm to about 40 mm, such as from about 20 mm to about 30 mm, for example from about 30 mm to about 110 mm, such as from about 30 mm to about 75 mm, for example from about 30 mm to about 70 mm, such as from about 30 mm to about 60 mm, for example from about 30 mm to about 50 mm, such as from about 30 mm to about 40 mm, for example from about 40 mm to about 110 mm, such as from about 40 mm to about 75 mm, for example from about 40 mm to about 70 mm, such as from about 40 mm to about 60 mm, for example from about 40 mm to about 50 mm, such as from about 50 mm to about 110 mm, for example from about 50 mm to about 75 mm, such as from about 50 mm to about 70 mm, for example from about 50 mm to about 60 mm, such as from about 60 mm to about 110 mm, for example from about 60 mm to about 75 mm, such as from about 70 mm to about 110 mm, for example from about 70 mm to about 80 mm.

In an example, the pitch $P_{Ribs}$ between two adjacent ribs 194 is from about 40 mm to about 200 mm, for example from about 40 mm to about 150 mm, such as from about 40 mm to about 140 mm, for example from about 40 mm to about 130 mm, such as from about 40 mm to about 120 mm, for example from about 40 mm to about 110 mm, such as from about 40 mm to about 100 mm, for example from about 40 mm to about 80 mm, such as from about 40 mm to about 70 mm, for example from about 60 mm to about 200 mm, such as from about 60 mm to about 150 mm, for example from about 60 mm to about 140 mm, such as from about 60 mm to about 130 mm, for example from about 60 mm to about 120 mm, such as from about 60 mm to about 110 mm, for example from about 60 mm to about 100 mm, such as from about 60 mm to about 80 mm, for example from about 80 mm to about 200 mm, such as from about 80 mm to about 150 mm, for example from about 80 mm to about 100 mm, such as from about 100 mm to about 200 mm, for example from about 100 mm to about 150 mm, such as from about 100 mm to about 140 mm, for example from about 100 mm to about 130 mm, such as from about 100 mm to about 120 mm, for example from about 125 mm to about 200 mm, such as from about 125 mm to about 150 mm, for example from about 125 mm to about 140 mm, such as from about 130 mm to about 150 mm, for example from about 75 mm to about 120 mm.

As shown in FIGS. 18 and 20A-20C, the electrode 198 can be welded to the top of the one or more ribs 194 with a plurality of welds 196. In an example, the electrode 198 is a planar electrode or an expanded metal or a mesh. In examples where the electrode 198 is an expanded metal or a mesh, the thickness of each strand that forms the mesh can be from about 0.5 mm to about 3 mm, for example from about 0.5 mm to about 2.5 mm, such as from about 0.5 mm to about 2 mm, for example from about 0.5 mm to about 1.5 mm, such as from about 0.5 mm to about 1 mm, for example from about 1 mm to about 3 mm, such as from about 1 mm to about 2.5 mm, for example from about 1 mm to about 2 mm, such as from about 1 mm to about 1.5 mm, for example from about 1.5 mm to about 3 mm, such as from about 1.5 mm to about 2.5 mm, for example from about 1.5 mm to about 2 mm, such as from about 2 mm to about 3 mm, for example from about 2.5 mm to about 3 mm.

The geometry, spacing, density, and/or cross-sectional area of the welds 196 can impact current flow through the pan assembly 190. As the operational current density is increased and more current flows through the cell, the density of the welds 196 (e.g., the cross-sectional area of the welds 196 and the spacing between welds 196) can impact the local Joule heating. The density of the welds 196 can be selected to reduce the or minimize the chances of membrane damage due to the formation local hot spots. The example welds 196 in FIGS. 20A-20C are illustrated as spots. However, the welds 196 can be in form of lines, spots, patterns, or any other shape, or combinations thereof. For example, a spot welder can form the welds 196 as spots, while a laser welder can produce the welds 196 as lines and/or spots and/or patterns. Patterns that the welds 196 can be formed as include, but are not limited to, a combination of dots, an array of dots, dashes, spots, lines, and line segments, which can be arranged in the pattern of any geometrically regular shape, such as a generally rectangular geometry, a generally circular geometry, or a generally hexagonal geometry, or can be arranged in an irregular shape.

Examples of welding techniques that can be used to form the welds 196 include, but are not limited to: laser welding, TiG welding, and spot welding, for example resistance spot welding. Laser welding may enable a single linear weld 196 along a substantial portion of the length $L_{Rib}$ of one of the ribs 194 up to and including the entire length $L_{Rib}$ of the rib 194 in order to weld the rib 194 to the electrode 198. For example, when the one or more ribs 194 are a solid plate (e.g., ribs 194A of FIG. 20A) or a plate with holes that does not include notches 208 (e.g., the ribs 194B of FIG. 20B), there may be a single linear weld 196 along the whole length $L_{Rib}$ of the rib 194 in order to join the rib 194 to the electrode 198. Laser welding or TiG welding may also be used to create welds 196 in the form of line segments. For example, when the one or more of the ribs 194 include notches 208 (e.g., the ribs 194C of FIG. 20C), there may be segments of weld lines over the portions of the ribs 194 that come into contact with the electrode 198, but not over the notches 208. Laser welding can also produce weld patterns comprising dots, an array of dots, dashes, spots, line segments, long lines, and any specified geometry, such as an oval geometry, rectangular geometry, circular geometry, hexagonal geometry, or combinations thereof. The weld geometries may be dictated by the shape of the welding tip and anvil, such as when the welds are created with resistance welding. TiG welds may be created manually, and can be in arbitrary form.

In an example, the geometry of the welds 196 includes the number of welds in the pan 192. The number of the welds 196 coupling the electrode 198 to the ribs 194 can impact the current distribution and the power dissipation within the pan assembly 190. In an example, the number of welds 196 per rib 194 that are in the form of the spots (such as the example spot welds 196 shown in FIGS. 18 and 20A-20C) is from 10 to 50 of the welds 196 per rib 194, for example from 10 to 40 of the welds 196 per rib 194, such as from 10 to 30 of the welds 196 per rib 194, for example from 10 to 20 of the welds 196 per rib 194, such as from 20 to 50 of the welds 196 per rib 194, for example from 20 to 40 of the welds 196 per rib 194, such as from 20 to 30 of the welds 196 per rib

194, for example from 30 to 40 of the welds 196 per rib 194, such as from 35 to 40 of the welds 196 per rib 194, for example from 40 to 50 of the welds 196 per rib 194.

In an example, the distance between the welds 196 when in the form of spot welds is from about 25 mm to about 200 mm, for example from about 25 mm to about 150 mm, such as from about 25 mm to about 100 mm, for example from about 25 mm to about 75 mm, such as from about 25 mm to about 50 mm, for example from about 50 mm to about 200 mm, such as from about 50 mm to about 150 mm, for example from about 50 mm to about 100 mm, such as from about 50 mm to about 75 mm, for example from about 75 mm to about 200 mm, such as from about 75 mm to about 150 mm, for example from about 75 mm to about 100 mm, such as from about 100 mm to about 200 mm, for example from about 100 mm to about 150 mm, independently in x- and y-directions.

In an example, the number of the welds 196 per rib 194 that are in the form of line welds or line segment welds is between 1 to 75 of the welds 196 per rib 194, for example from 1 to 70 of the welds 196 per rib 194, such as from 1 to 60 of the welds 196 per rib 194, for example from 1 to 50 of the welds 196 per rib 194, such as from 1 to 40 of the welds 196 per rib 194, for example from 1 to 30 of the welds 196 per rib 194, such as from 1 to 20 of the welds 196 per rib 194, for example from 1 to 10 of the welds 196 per rib 194, such as from 2 to 75 of the welds 196 per rib 194, for example from 2 to 70 of the welds 196 per rib 194, such as from 2 to 60 of the welds 196 per rib 194, for example from 2 to 50 of the welds 196 per rib 194, such as from 2 to 40 of the welds 196 per rib 194, for example from 2 to 30 of the welds 196 per rib 194, such as from 2 to 20 of the welds 196 per rib 194, for example from 2 to 10 of the welds 196 per rib 194, such as from 10 to 75 of the welds 196 per rib 194, for example from 10 to 70 of the welds 196 per rib 194, such as from 10 to 60 of the welds 196 per rib 194, for example from 10 to 50 of the welds 196 per rib 194, such as from 10 to 40 of the welds 196 per rib 194, for example from 10 to 30 of the welds 196 per rib 194, such as from 10 to 20 of the welds 196 per rib 194, for example from 25 to 75 of the welds 196 per rib 194, such as from 25 to 50 of the welds 196 per rib 194, for example from 50 to 75 of the welds 196 per rib 194, such as from 60 to 75 of the welds 196 per rib 194.

In an example, the distance between the welds 196 when in the form of the line welds or line segment welds is from about 40 mm to about 200 mm, for example from about 40 mm to about 150 mm, such as from about 40 mm to about 100 mm, for example from about 40 mm to about 75 mm, such as from about 75 mm to about 200 mm, for example from about 75 mm to about 150 mm, such as from about 75 mm to about 100 mm, for example from about 100 mm to about 200 mm, such as from about 100 mm to about 150 mm, for example from about 150 mm to about 200 mm, independently in x- and y-directions.

In an example, when the one or more ribs 194 comprise the one or more notches 208 and the welds 196 comprise one or more line segments that weld the electrode 198 to the ridges of the ribs 194 formed between notches 208, the line segment of a particular weld 196 can run along the entire length of a ridge between notches 208 or along only a partial length of a ridge between notches 208. In an example, the length of a line segment weld 196 is the length of the ridge between notches 208 or the length of the line segment weld 196 is from about 0.25 m to about 1 m, for example from about 0.25 m to about 0.8 m, such as from about 0.25 m to about 0.6 m, for example from about 0.25 m to about 0.5 m, such as from about 0.25 m to about 0.4 m, for example from about 0.25 m to about 0.3 m, such as from about 0.5 m to about 1 m, for example from about 0.5 m to about 0.8 m, such as from about 0.5 m to about 0.6 m, for example from about 0.6 m to about 1 m, such as from about 0.6 m to about 0.8 m, for example from about 0.7 m to about 1 m, such as from about 0.7 m to about 0.8 m, for example from about 0.8 m to about 1 m.

In an example, the distance between two adjacent line segment welds 196 is from about 5 mm to about 100 mm, for example from about 5 mm to about 80 mm, such as from about 5 mm to about 60 mm, for example from about 5 mm to about 50 mm, such as from about 5 mm to about 40 mm, for example from about 5 mm to about 30 mm, such as from about 5 mm to about 20 mm, for example from about 5 mm to about 10 mm, such as from about 10 mm to about 100 mm, for example from about 10 mm to about 50 mm, such as from about 10 mm to about 40 mm, for example from about 10 mm to about 30 mm, such as from about 10 mm to about 20 mm, for example from about 20 mm to about 100 mm, such as from about 20 mm to about 50 mm, for example from about 20 mm to about 40 mm, such as from about 20 mm to about 30 mm, for example from about 30 mm to about 100 mm, such as from about 30 mm to about 50 mm, for example from about 30 mm to about 40 mm, such as from about 40 mm to about 100 mm, for example from about 40 mm to about 50 mm, such as from about 50 mm to about 100 mm, for example from about 75 mm to about 100 mm.

In example, the cross-sectional area of each weld 196 is from about 6 square millimeters (mm$^2$) to about 3300 mm$^2$, for example from about 6 mm$^2$ to about 3000 mm$^2$, such as from about 6 mm$^2$ to about 2000 mm$^2$, for example from about 6 mm$^2$ to about 1000 mm$^2$, such as from about 6 mm$^2$ to about 500 mm$^2$, for example from about 6 mm$^2$ to about 300 mm$^2$, such as from about 6 mm$^2$ to about 100 mm$^2$, for example from about 50 mm$^2$ to about 3300 mm$^2$, such as from about 50 mm$^2$ to about 3000 mm$^2$, for example from about 50 mm$^2$ to about 2000 mm$^2$, such as from about 50 mm$^2$ to about 1000 mm$^2$, for example from about 50 mm$^2$ to about 500 mm$^2$, such as from about 50 mm$^2$ to about 300 mm$^2$, for example from about 50 mm$^2$ to about 100 mm$^2$, such as from about 100 mm$^2$ to about 3300 mm$^2$, for example from about 100 mm$^2$ to about 3000 mm$^2$, such as from about 100 mm$^2$ to about 2000 mm$^2$, for example from about 100 mm$^2$ to about 1000 mm$^2$, such as from about 100 mm$^2$ to about 500 mm$^2$, for example from about 100 mm$^2$ to about 300 mm$^2$, such as from about 500 mm$^2$ to about 3300 mm$^2$, for example from about 500 mm$^2$ to about 3000 mm$^2$, such as from about 500 mm$^2$ to about 2000 mm$^2$, for example from about 500 mm$^2$ to about 1000 mm$^2$, such as from about 1000 mm$^2$ to about 3300 mm$^2$, for example from about 1000 mm$^2$ to about 3000 mm$^2$, such as from about 1000 mm$^2$ to about 2000 mm$^2$, for example from about 2000 mm$^2$ to about 3000 mm$^2$, such as from about 2500 mm$^2$ to about 3000 mm$^2$.

In an example, the geometry, spacing or density, and/or cross-sectional area of the welds 196 is such that a ratio of the cross-sectional area of the electrode 198 relative to the total cross-sectional area of the welds 196 is from about 15:1 to about 2000:1, for example from about 15:1 to about 1000:1, such as from about 15:1 to about 500:1.

In an example, the geometry, spacing or density, and/or cross-sectional area of the welds 196 is such that the current density through each weld 196 when the cell 190 is operating at its maximum current density is about 20 amps per square millimeter (A/mm$^2$) or less, for example about 19 A/mm$^2$ or less, such as 18 A/mm$^2$ or less, for example about 17 A/mm² or less, such as about 16 A/mm² or less, for example about 15 A/mm² or less, such as about 14 A/mm² or less, for example about 13 A/mm² or less, such as about 12.5 A/mm² or less, for example about 12 A/mm² or less, such as about 11 A/mm² or less, for example about 10 A/mm² or less, such as about 9 A/mm² or less, for example about 8 A/mm² or less, or from about 5 A/mm² to about 20 A/mm², such as from about 7.5 A/mm² to about 15 A/mm², for example from about 7.5 A/mm² to about 10 A/mm².

In one specific and non-limiting example, the welds 196 are in the form of spot welds and there are from 10 to 50 of the welds 196 per rib 194, the distance between adjacent spot welds 196 is from about 25 mm to about 200 mm (independently in the x- and y-directions), the cross-sectional area of each spot weld 1% is from about 6 mm² to about 3300 mm², and the current density through each spot weld 196 is 6 A/mm² or less, for example 4 A/mm² or less. In another specific and non-limiting example, the welds 196 are in the form of line welds and there from 1 to 75 of the welds 196 per rib 194, the distance between adjacent line welds 196 is from about 40 mm to about 200 mm (independently in the x- and y-directions), the cross-sectional area of each line weld 196 is from about 6 mm² to about 3300 mm², and the current density through each line weld 196 is 6 A/mm² or less, for example 4 A/mm² or less.

In an example, an electrochemical cell 100 comprising a pan assembly with one or any combination of the structures described above for the pan assemblies 140, 160, 190 for one or both of the anode half cell 111 and the cathode half cell 121 can operate at a current density of from about 300 mA/cm² to about 6000 mA/cm², for example from about 300 mA/cm² to about 5000 mA/cm², such as from about 300 mA/cm² to about 4000 mA/cm², for example from about 300 mA/cm² to about 3000 mA/cm², such as from about 300 mA/cm² to about 2000 mA/cm², for example from about 300 mA/cm² to about 1000 mA/cm², such as from about 300 mA/cm² to about 800 mA/cm², for example from about 300 mA/cm² to about 600 mA/cm², such as from about 300 mA/cm² to about 500 mA/cm², for example from about 500 mA/cm² to about 6000 mA/cm², such as from about 500 mA/cm² to about 5000 mA/cm², for example from about 500 mA/cm² to about 4000 mA/cm², such as from about 500 mA/cm² to about 3000 mA/cm², for example from about 500 mA/cm² to about 2000 mA/cm², such as from about 500 mA/cm² to about 1000 mA/cm², for example from about 500 mA/cm² to about 800 mA/cm², such as from about 500 mA/cm² to about 600 mA/cm², for example from about 600 mA/cm² to about 6000 mA/cm², such as from about 600 mA/cm² to about 5000 mA/cm², for example from about 600 mA/cm² to about 4000 mA/cm², such as from about 600 mA/cm² to about 3000 mA/cm², for example from about 600 mA/cm² to about 2000 mA/cm², such as from about 600 mA/cm² to about 1000 mA/cm², for example from about 600 mA/cm² to about 800 mA/cm², such as from about 800 mA/cm² to about 6000 mA/cm², for example from about 800 mA/cm² to about 5000 mA/cm², such as from about 800 mA/cm² to about 4000 mA/cm², for example from about 800 mA/cm² to about 3000 mA/cm², such as from about 800 mA/cm² to about 2000 mA/cm², for example from about 800 mA/cm² to about 1000 mA/cm², such as from about 1000 mA/cm² to about 6000 mA/cm², for example from about 1000 mA/cm² to about 5000 mA/cm², such as from about 1000 mA/cm² to about 4000 mA/cm², for example from about 1000 mA/cm² to about 3000 mA/cm², such as from about 1000 mA/cm² to about 2000 mA/cm², for example from about 2000 mA/cm² to about 6000 mA/cm², such as from about 2000 mA/cm² to about 5000 mA/cm², for example from about 2000 mA/cm² to about 4000 mA/cm², such as from about 2000 mA/cm² to about 3000 mA/cm², for example from about 3000 mA/cm² to about 6000 mA/cm², such as from about 3000 mA/cm² to about 5000 mA/cm², for example from about 3000 mA/cm² to about 4000 mA/cm², such as from about 4000 mA/cm² to about 6000 mA/cm², for example from about 4000 mA/cm² to about 5000 mA/cm², such as from about 5000 mA/cm² to about 6000 mA/cm². In some examples, an electrochemical cell 100 comprising any one of the pan assemblies 140, 160, 190 for one or both of the anode half cell 111 and the cathode half cell 121 operates at high current densities of from about 300 mA/cm² to about 3000 mA/cm², such as from about 300 mA/cm² to about 2000 mA/cm², for example from about 300 mA/cm² to about 1000 mA/cm², such as from about 300 mA/cm² to about 800 mA/cm², for example from about 300 mA/cm² to about 600 mA/cm², such as from about 300 mA/cm² to about 500 mA/cm² for example from about 300 mA/cm² to about 400 mA/cm².

In an example, a pan assembly comprising one or any combination of the structures described above for the pan assemblies 140, 160, 190 can accommodate a high flow rate of electrolyte (either anolyte through an anode pan assembly or catholyte through a cathode pan assembly), for example from about 200 kilograms per hour (kg/h) to about 10,000 kg/h, such as from about 200 kg/h to about 9000 kg/h, for example from about 200 kg/h to about 8000 kg/h, such as from about 200 kg/h to about 7000 kg/h, for example from about 200 kg/h to about 6000 kg/h, such as from about 200 kg/h to about 5000 kg/h, for example from about 200 kg/h to about 4000 kg/h, such as from about 200 kg/h to about 3000 kg/h, for example from about 200 kg/h to about 2000 kg/h, such as from about 200 kg/h to about 1000 kg/h, for example from about 500 kg/h to about 10,000 kg/h, such as from about 500 kg/h to about 9000 kg/h, for example from about 500 kg/h to about 8000 kg/h, such as from about 500 kg/h to about 7000 kg/h, for example from about 500 kg/h to about 6000 kg/h, such as from about 500 kg/h to about 5000 kg/h, for example from about 500 kg/h to about 400 kg/h, such as from about 500 kg/h to about 3000 kg/h, for example from about 500 kg/h to about 2000 kg/h, such as from about 500 kg/h to about 1000 kg/h, for example from about 800 kg/h to about 10,000 kg/h, such as from about 800 kg/h to about 9000 kg/h, for example from about 800 kg/h to about 8000 kg/h, such as from about 800 kg/h to about 7000 kg/h, for example from about 800 kg/h to about 6000 kg/h, such as from about 800 kg/h to about 5000 kg/h, for example from about 800 kg/h to about 4000 kg/h, such as from about 800 kg/h to about 3000 kg/h, for example from about 800 kg/h to about 2000 kg/h, such as from about 800 kg/h to about 1000 kg/h, for example from about 1000 kg/h to about 10,000 kg/h, such as from about 1000 kg/h to about 9000 kg/h, for example from about 1000 kg/h to about 8000 kg/h, such as from about 1000 kg/h to about 7000 kg/h, for example from about 1000 kg/h to about 6000 kg/h, such as from about 1000 kg/h to about 5000 kg/h, for example from about 1000 kg/h to about 4000 kg/h, such as from about 1000 kg/h to about 3000 kg/h, for example from about 1000 kg/h to about 2000 kg/h, such as from about 3000 kg/h to about 10,000 kg/h, for example from about 3000 kg/h to about 9000 kg/h, such as from about 3000 kg/h to about 8000 kg/h, for example from about 3000 kg/h to about 7000 kg/h, such as from about 3000 kg/h to about 6000 kg/h, for example from about 3000 kg/h to about 5000 kg/h, such as from about 5000 kg/h to about 10,000 kg/h, for example from about 5000 kg/h to about 8000 kg/h, such as from about 5000 kg/h to about 6000 kg/h, for example from about 6000 kg/h to about 10,000 kg/h, such as from about 6000 kg/h to about 8000 kg/h, for example from about 8000 kg/h to about 10,000 kg/h.

In an example, a pan assembly comprising one or any combination of the structures described above for the pan assemblies 140, 160, 190 can provide for a superficial liquid velocity of the electrolyte through the pan assembly 140, 160, 190 of 0.1 m/s or less, for example 0.08 m/s or less, such as 0.05 m/s or less, for example 0.01 m/s or less.

Temperature Control

Control of the temperature within the electrochemical cell can be important for operation of the cell. In operation, the current density through the cell can be varied often, for instance to take advantage of power price fluctuations (as described below). To maximize performance and the lifetime of the separator, it is generally preferred to maintain the separator within a small range of temperatures. If the temperatures of the electrolyte inlets into the electrochemical cell is held constant or substantially constant while the current density is changed significantly, the temperature at the separator will vary significantly.

Figure 21:
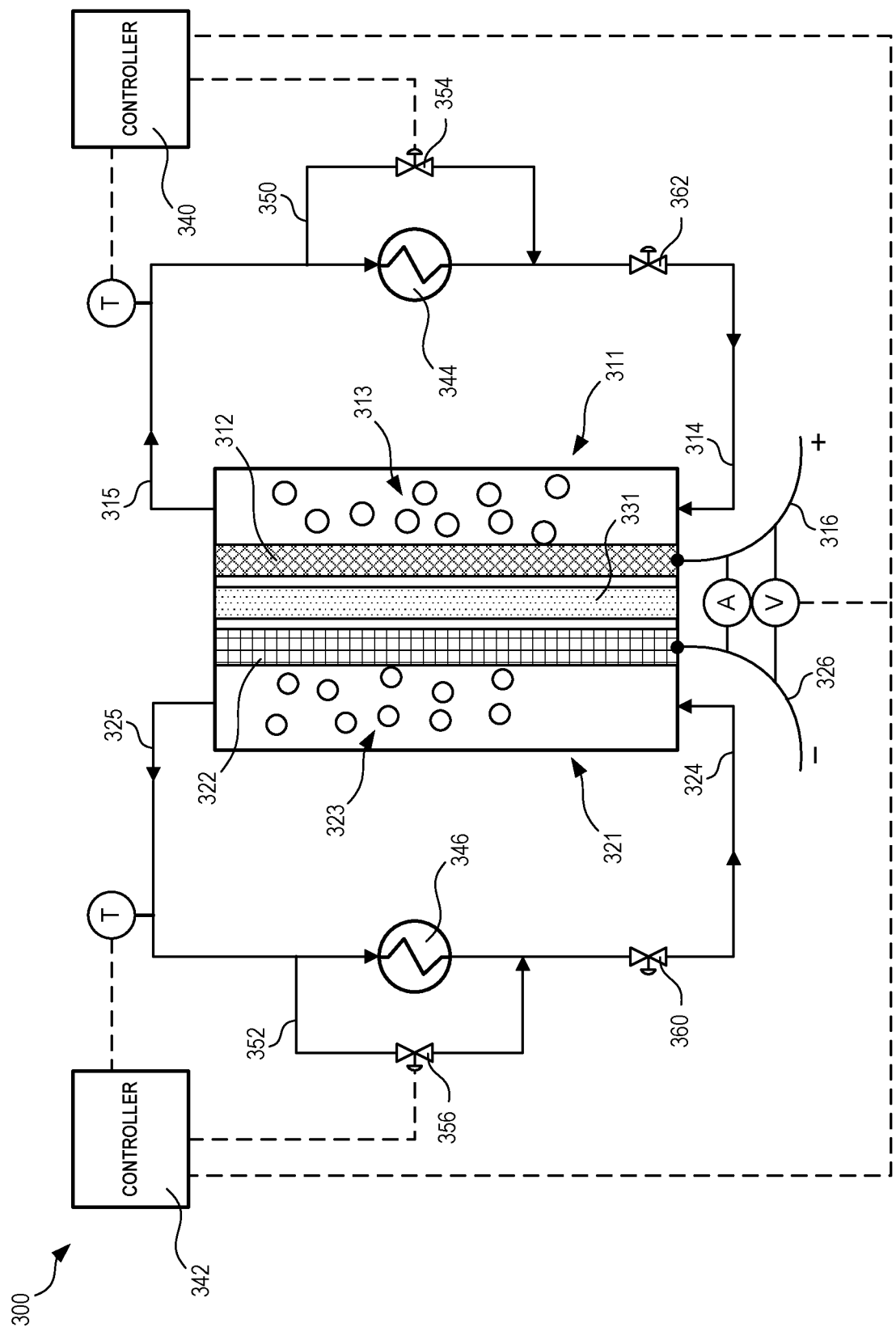
FIG. 21 is a schematic diagram of an example electrolyzer cell with an electrolyte temperature control system.

The inventors have discovered that the flow rates of electrolyte through the anode half cell and the cathode half cell of the electrochemical cell 100 can be set so that the resulting temperature of the electrolyte outlet streams can be maintained within a specified range at the highest expected operational current density using convenient temperatures for the inlet streams. FIG. 21 shows an example electrochemical cell 300 that is configured for temperature control to maintain a temperature of a separator 331 within the cell 300. The cell 300 is similar to the example cell 100 described above with respect to FIG. 1. For example, like the cell 100, the electrochemical cell 300 comprises two half cells: a first half cell 311 and a second half cell 321. In an example, the first and second half cells 311, 321 are separated by a separator 331, such as a membrane 331.

The first half cell 311 can comprise a first electrode 312, which can be placed proximate to the separator 331, and the second half cell 321 can comprise a second electrode 322, which can be placed proximate to the separator 331, for example on an opposite side of the separator 331 from the first electrode 312. In an example, the first electrode 312 is the anode for the cell 300 and the second electrode 322 is the cathode for the cell 300, such that the first half cell 311 may also be referred to as the anode half cell 311, the first electrode 312 may also be referred to as the anode 312, the second half cell 321 may also be referred to as the cathode half cell 321, and the second electrode 322 may also be referred to as the cathode 322. Each of the electrodes 312, 322 can be coated with one or more electrocatalysts to speed the reaction toward the hydrogen gas ($H_2$ gas) and/or the oxygen gas ($O_2$ gas), such as, but are not limited to, highly dispersed metals or alloys of platinum group metals, such as platinum, palladium, ruthenium, rhodium, iridium, or their combinations such as platinum-rhodium, platinum-ruthenium, or nickel mesh coated with ruthenium oxide ($RuO_2$).

The anode 312 can be electrically connected to an external positive conductor 316 and the cathode 322 can be electrically connected to an external negative conductor 326. When the separator 331 is wet and is in electrolytic contact with the electrodes 312 and 322, and an appropriate voltage is applied across the conductors 316 and 326, $O_2$ gas is liberated at the anode 312 or $H_2$ gas is liberated at the cathode 322, or both. In certain configurations, an electrolyte, e.g., one comprising of a solution of KOH in water, is fed into the half cells 311, 321. For example, the electrolyte can flow into the anode half cell 311 through a first electrolyte inlet 314 and into the cathode half cell 321 through a second electrolyte inlet 324. In an example, the flow of the electrolyte through the anode half cell 311 can pick up produced $O_2$ gas as bubbles 313, which exit the anode half cell 311 through a first outlet 315. Similarly, the flow of the electrolyte through the cathode half cell 321 can pick up produced $H_2$ gas as bubbles 323, which can exit the cathode half cell 321 through a second outlet 325.

By referring to a lookup table an operator can set the temperatures of the inlet streams 314, 324 as a function of the current density at which the cell 300 is currently being run such that the resulting temperatures of the outlet streams 315, 325 does not fluctuate significantly, e.g., so that the temperatures of the outlet streams 315, 325 are within a specified temperature variance of a target temperature. In another example, the temperature of the inlet streams 314, 324 can be varied in order to maintain a temperature of the separator 331 at a constant or substantially constant set point (which can be determined by measuring the temperatures of one or both of the outlet streams 325, 315 and calculating the temperature of the separator 331 based on one or more of the temperature of the outlet stream(s) 315, 325 and the operating current density). In an example, the inlet temperature control is automated through one or more controllers 340, 342 (e.g., a first controller 340 configured for temperature control of the first inlet stream 314 and a second controller 342 configured for temperature control of the second outlet stream 324 based on temperature of the second outlet stream 325), such as a programmable logic controller ("PLC"). The temperature control can be linked to one or more of: the current density setting (e.g., the current across the electrolyzer cell 300 per area of the electrodes 312, 322), the voltage across the electrolyzer cell 300, and the temperature of the corresponding outlet stream 315, 325. In some examples, the temperature control can be automated using a proportional-integral-derivative ("PID") controller, or a feed-forward control scheme, or both. In an example, the inlet temperature control is controlled via a feed-forward control based on a current density setpoint and the observed voltage across the electrolyzer cell 300. In another example, in addition to the feed-forward control by current density, the temperature of the corresponding electrolyte outlet 315, 325 can also be used to control the temperature of the inlet 314, 324 via a PID controller tuned for slow response, which can allow the temperature of the outlet 315, 325 to fine tune the temperature of the inlet 314, 324, after a fast response from the feed-forward controller.

In an example, shown in FIG. 21, control of the temperatures of the inlet stream 314, 324 is effectively accomplished using a mixing scheme with a cooling heat exchanger 344, 346 that can cool at least a portion of the hot electrolyte return as it flows from the electrolyte outlet 315, 325 to the corresponding electrolyte inlet 314, 315. In the example of FIG. 21, a first cooling heat exchanger 344 is configured for cooling electrolyte of the first outlet stream 315 exiting the anode half cell 311 before it is recycled to the first inlet stream 314. A similar second cooling heat exchanger 346 is configured for cooling electrolyte of the second outlet stream 325 exiting the cathode half cell 321 before it is recycled to the second inlet stream 324. In an example, the electrolyte recycling configuration can include a bypass line 350, 352 that is configured to allow some or all of the recycling electrolyte to bypass the cooling heat exchanger 344, 346 (e.g., a first bypass line 350 to bypass the first cooling heat exchanger 344 and a second bypass line 352 to bypass the second cooling heat exchanger 346) so that the bypassing portion of the electrolyte is not cooled and remains at or near the hot temperature at the electrolyte outlet 315, 325. A corresponding bypass control valve 354, 356 can be included to modulate the proportion of recycling electrolyte that flows through the cooling heat exchanger 344, 346 and the proportion that will flow through the bypass line 350, 352 (e.g., a first control valve 354 to modulate flow through the first cooling heat exchanger 344 and the first bypass line 350 and a second control valve 356 to modulate flow through the second cooling heat exchanger 346 and the second bypass line 352). In the example shown in FIG. 21, the bypass control valves 354, 356 are situation on the bypass lines 350, 352. However, those having skill in the art will appreciate that the control valve(s) can be positioned at the inlet line feeding into the cooling heat exchangers 344, 346 or at the outlet line exiting the cooling heat exchangers 344, 346, which would still achieve the same effect of modulating the proportion of the electrolyte that flows through the heat exchangers 344, 346 and the bypass lines 350, 352.

The streams flowing through the cooling heat exchanger 344, 346 and the bypass line 350, 352 are then mixed to achieve a specified set-point temperature. For example, if it is desired that the temperature of the electrolyte fed to the cell 300 via the inlet 314, 324 be higher than its current temperature, then the control valve 354, 356 can be controlled so that a lower proportion of the electrolyte flows through the cooling heat exchanger 344, 346 relative to the proportion of the electrolyte that flows through the bypass line 350, 352 so that a relatively smaller amount of the electrolyte is cooled by the cooling heat exchanger 344, 346, and thus so that the temperature of the electrolyte after mixing the two streams is higher. Similarly, if it is desired that the temperature of the electrolyte fed to the cell 300 be lower than its current temperature, then the control valve 354, 356 can be controlled so that a higher proportion of the electrolyte flows through the cooling heat exchanger 344, 346 relative to the proportion that flows through the bypass line 350, 352 so that a relatively higher amount of the electrolyte is cooled by the cooling heat exchanger 344, 346, and thus so that the temperature of the electrolyte after mixing the two streams is lower.

In an example, a flow control valve 360, 362 located downstream of the mixing point can ensure that a feed flow rate of the electrolyte to the inlet 314, 324 remains constant or substantially constant (e.g., a first flow control valve 360 to control the flow rate of electrolyte to the first inlet 314 and a second flow control valve 362 to control the flow rate of electrolyte to the second inlet 324). In another example (not shown), a temperature control valve (similar to the control valve 354, 356 in FIG. 21) can control the flow rate through the cooling heat exchanger 344, 346 and a flow control valve can control the flow rate through the heat exchanger bypass line 350, 352. In an example, the cooling heat exchanger 344, 346 is at least slightly oversized (in terms of the flow rate that the heat exchanger 344, 346 can accommodate or the heat exchange capacity of the heat exchanger 344, 346), so that the combination of the cooling heat exchanger 344, 346 and the bypass line 350, 352 can provide for adequate temperature control and flow control. The inventors have found that this type of temperature control for the electrolyte inlet stream 314, 324 can provide for fast and linear or substantially linear inlet temperature control, compared to controlling the temperature of the inlet stream 314, 324 by changing the amount of cooling water being fed to the cooling heat exchanger 344, 346.

The combination of a fast linear temperature control of the inlet 314, 324 with a feed-forward controller setting the inlet temperature set point based on current density or observed voltage across the cell 300, or both, can provide for stable temperature control for the outlet stream 315, 325 when changing the current density (e.g., when changing the current density being applied across the cell 300 in order to change the $H_2$ production rate to account for changes in electricity pricing, as described in more detail below). Rapid temperature management in this way can compensate for quick changes of current density while minimizing thermal shock to the separator 331, the electrodes 312, 322, and other components of the cell 300.

Dynamic Cell Operation for Improved Overall Operating Expense

The various structural aspects of the electrolyzer cells and other supporting apparatus described above—i.e., the manifold 144 and outlet tube 146 configuration of the example pan assembly 140 to accommodate a high gas production rate and a high electrolyte flow rate (as described above with respect to FIGS. 3-8); the baffle plate assembly 162 of the example pan assembly 160 to further accommodate the high gas production rate and high electrolyte flow rate and to assist in temperature distribution within the electrolyte flowing through the pan assembly (as described above with respect to FIGS. 9-15); the ribs 194 and welds 196 for coupling the electrode 198 to the ribs 194 for power and current distribution and improved temperature distribution (as described above with respect to FIGS. 16-19 and 20A-20C); and the temperature control subsystem for maintaining the electrolyte temperature during operation of the cell in response to changes in current density (as described above with respect to FIG. 21)—allow the overall water electrolysis $H_2$ gas generation system to be flexible and dynamically accommodate a wide range of operational parameters. Specifically, the structural and systematic aspects described herein can allow the electrolyzer cells to operate over a wide range of current densities while still being able to accommodate a wide disparity in heat generation, temperature fluctuation, and gas production rate. For example, electrolyzer cells comprising one or more of these features can operate at a current density over a dynamic range of from as low as about 150 milliamps per square centimeter (mA/cm$^2$) to as high as about 3000 mA/cm$^2$, such as from about 250 mA/cm$^2$ to about 2750 mA/cm$^2$, for example from about 500 mA/cm$^2$ to about 2500 mA/cm$^2$, such as from about 750 mA/cm$^2$ to about 2250 mA/cm$^2$, for example from about 1000 mA/cm$^2$ to about 2000 mA/cm$^2$. The structural and systematic aspects described herein also allow the electrolyzer cells to accommodate a wide range electrolyte flow rates and gas production rates while still reducing or minimizing slug or plug flow of the electrolyte or the produced gas through the electrolyzer cells and/or exiting the electrolyzer cells.

These structural and systematic aspects can allow the electrolyzer cells to be operated at a current density that is higher than a specified current density and/or at a $H_2$ gas production rate that is higher than a specified gas production rate (i.e., the "nominal" current density and/or the "nominal" $H_2$ gas production rate for the electrolyzer cell or for the plant as a whole) during a period when demand for electricity and/or the price of electricity is below a specified threshold and/or when demand for electricity and/or the price of electricity is decreasing, which will also be referred to hereinafter as "load gaining," to take advantage of situations where the demand for electricity and/or the price of electricity is below a specified threshold. Likewise, the electrolyzer cells are configured to be operated at a current density that is lower than a specified current density and/or at a $H_2$ gas production rate that is lower than a specified gas production rate (i.e., the "nominal" current density and/or the "nominal" $H_2$ gas production rate for the electrolyzer cell or for the plant as a whole) during a period when demand for electricity and/or the price of electricity is above a specified threshold and/or when price and/or demand is increasing, which will also be referred to hereinafter as "load shedding," to take advantage of situations where the demand for electricity and/or the price of electricity is above the specified, threshold or when price or demand is increasing. In some examples, the electrolyzer described herein is configured to operate within a range of current density values of 0.15 $A/cm^2$ and 3.0 $A/cm^2$. However, it should be understood that other ranges and values of current density are suitable for use with the electrolyzer and methods described herein including current density values above 3.0 $A/cm^2$ and/or below 0.15 $A/cm^2$.

As will be appreciated by those having skill in the art, the price or demand of electricity can vary greatly depending on the location of the electrolyzer cells. Therefore, unless stated otherwise herein, the terms "price" or "demand," as used herein when referring to electricity, are the price or demand of electricity within the relevant region in which the electrolyzer cells are located.

The electrolyzer cells described herein can also be manufactured at relatively low capital expenditures ("CapEx") compared to conventional water-splitting electrolysis cells. As used herein, the terms "capital expenditures" and "CapEx" refers to capital expenses incurred to engineer, design, procure, and construct the electrolyzer cells and supporting equipment (e.g., piping, deionized water generation, pumps for electrolyte and water circulation, gas processing and storage, electricity rectifiers, electricity transformers, and electricity bussing).

The relatively low CapEx cost required to design and construct the electrolyzer cells of the present disclosure can allow the electrolyzer cells to be designed to be capable of accommodating a maximum current density that is higher than the "nominal" current density, e.g., the current density associated with an optimum current density for which the electrolyzer cells are being designed (which corresponds to a nominal desired H gas production rate for which the overall plant is being designed). In other words, if the total plant is designed for an average $H_2$ gas production capacity (corresponding to a particular cell size and nominal current density), then the cells can be designed with one or more of the structure features described above that allow the electrolyzer cell to achieve a higher current density (and thus a higher $H_2$ gas production rate) without making the design of the cells uneconomical. For example, the designed $H_2$ gas production rate for the entire plant may translate to a nominal operating current density of about 1 $A/cm^2$. But in accordance with the present disclosure, the electrolyzer cells can be designed so that they can handle a substantially larger current density, such as a current density of about 1.5 $A/cm^2$ or higher, for example about 1.6 $A/cm^2$ or higher, such as about 1.7 $A/cm^2$ or higher, for example about 1.75 $A/cm^2$ or higher, such as about 1.8 $A/cm^2$ or higher, for example about 1.9 $A/cm^2$ or higher, such as about 2 $A/cm^2$ or higher, for example about 2.1 $A/cm^2$ or higher, such as about 2.2 $A/cm^2$ or higher, for example about 2.25 $A/cm^2$ or higher, such as about 2.3 $A/cm^2$ or higher, for example about 2.4 $A/cm^2$ or higher, such as about 2.5 $A/cm^2$ or higher, for example about 2.6 $A/cm^2$ or higher, such as about 2.7 $A/cm^2$ or higher, for example about 2.75 $A/cm^2$ or higher, such as about 2.8 $A/cm^2$ or higher, for example about 2.9 $A/cm^2$ or higher, such as about 3 $A/cm^2$ or higher, for example about 3.1 $A/cm^2$ or higher, such as about 3.2 $A/cm^2$ or higher, for example about 3.25 $A/cm^2$ or higher, such as about 3.3 $A/cm^2$ or higher, for example about 3.4 $A/cm^2$ or higher, such as about 3.5 $A/cm^2$ or higher in order to be able to take advantage of electricity demand and/or prices that are below a specified threshold and/or a decreasing demand and/or price in a load gaining situation. Similarly, the supporting equipment for the cells (e.g., piping, deionized water generation, pumps for electrolyte and water circulation, gas processing and storage, electricity rectifiers, electricity transformers, and electricity bussing) may be "oversized" relative to what would be required for the nominal $H_2$ gas production rate and nominal current density in order to take advantage of potential load gaining situations and the higher heat distribution and larger $H_2$ gas handling requirements associated with load gaining.

The relatively low CapEx of the electrolyzer cells described herein and their supporting equipment are such that it can still be economical, from a capital investment perspective, to operate the electrolyzer cells of the present disclosure at a current density that is lower than a specified current density and/or at a gas production rate that is lower than a specified gas production rate (which can be the same or different from the specified current density or the specified $H_2$ gas production rate associated with a load gaining situation, for example the specified current density can be certain percentage of the nominal current density and/or the specified $H_2$ gas production rate can be a certain percentage of the nominal $H_2$ gas production rate) when carrying out load shedding in order to reduce the overall operating expenditures ("OpEx") when the demand and/or price of electricity is above a threshold and/or increasing demand and/or price. As used herein, the terms "operating expenditures" and "OpEx" refer to the ongoing cost of generating hydrogen gas with the electrolyzer cells and other supporting equipment, which can include, but is not limited to, electricity costs, operations labor, regular ongoing maintenance, insurance, engineering and supervision operations, short-term consumables, and sales and administration expenses. In contrast, typical electrolyzer cells having higher CapEx costs cannot economically produce hydrogen in a load shedding situation, even though it reduces the OpEx, because the CapEx of the typical electrolyzer cells are so high.

The electrolyzer cells and overall system of the present disclosure allow for dynamic control over the current density at which the electrolyzer cells are capable of effectively and efficiently load shedding and load gaining compared to existing electrolyzer cells. As described in more detail below, the ability of the electrolyzer cells to operate over a wide range of current densities and gas production rates allows the systems and methods described herein to provide for strategic and dynamic operation of the electrolyzer cells for $H_2$ gas production so that the average cost for $H_2$ gas production is reduced and in some instances minimized over the course of long-range operation of the system. In an example, the electrolyzer cells can be designed to be operated at a maximum current density (which results in a corresponding maximum $H_2$ gas production rate) that is 1 amp per square centimeter ($A/cm^2$) or more, for example a maximum achievable current density of about 1.5 $A/cm^2$, for example a maximum achievable current density of about 2.0 $A/cm^2$, for example about 2.5 $A/cm^2$, for example a maximum achievable current density of about 3 $A/cm^2$ for example a maximum achievable current density of about 3.5 $A/cm^2$. In addition, the electrolyzer cells and overall system of the present disclosure can allow for economic operation at a minimum economically-viable current density (which results in a corresponding minimum $H_2$ gas production rate) of about 750 milliamps per square centimeter ($mA/cm^2$) or less, for example a minimum economically-viable current density of about 600 $mA/cm^2$, for example a minimum economically-viable current density of about 500 $mA/cm^2$, for example a minimum economically-viable current density of about 400 $mA/cm^2$, such as a minimum economically-viable current density of about 300 $mA/cm^2$, for example a minimum economically-viable current density of about 250 $mA/cm^2$, for example a minimum economically-viable current density of about 200 $mA/cm^2$, for example a minimum economically-viable current density of about 150 $mA/cm^2$. Therefore, in an example where the maximum achievable current density for the electrolyzer cells is about 3 $A/cm^2$ (or about 3000 $mA/cm^2$) and a minimum economically-viable current density of about 150 $mA/cm^2$, then the electrolyzer cell is able to operate as low as about 5% of the maximum achievable current density (i.e., 150 $mA/cm^2$ being 5% of 3000 $mA/cm^2$), which means that the electrolyzer cells have a load shedding and load gaining operating range of 95% (i.e., from 5% to 100% of the maximum achievable current density).

The electrolyzer cell's ability to dynamically operate at high current density and low current density can allow the operator to dynamically respond to electricity prices and/or electricity demand and load gain when electricity prices and/or demand are low and/or are decreasing and load shed when electricity prices and/or demand are high and/or are increasing. For example, if the demand for electricity increases over a period of time, then the OpEx for the electrolyzer cell will increase by a corresponding amount over the same period of time due to an increase in the price of electricity unless the operating current density of the electrolyzer cell is dynamically decreased. Thus, in a load shedding situation, the dynamic lowering of the current density has the effect of dynamically reducing the OpEx to counteract the expected rise in OpEx associated with the increase in demand.

In other words, the operating current density of the electrolyzer cells can be changed in response to a period of time when the demand for electricity and/or the price of electricity is fluctuating. Fluctuation in demand can include increases in demand (e.g., wherein demand during a first period of time is lower than during a subsequent second period of time) or decreases in demand (e.g., wherein demand during a first period of time is higher than during a subsequent second period of time). Similarly, fluctuation in price can include increases in price (e.g., wherein the price of electricity during a first period of time is lower than during a subsequent second period of time) or decreases in price (e.g., wherein the price of electricity during a first period of time is higher than during a subsequent second period of time). The dynamic operation of the electrolyzer cells can be particular useful during periods of time where the demand for electricity and/or the price of electricity is known to fluctuate (i.e., is known to increase or decrease), such as during a time period spanning from the night time to mid-to-late afternoon.

The electrolyzer cells can be designed to achieve a maximum capacity. As used herein, the term "maximum capacity," when referring to the electrolyzer cells, refers to the maximum current density that the electrolyzer cell can reliably achieve (taking into account the ability of the electrolyzer cell to dissipate generated heat in order to avoid or minimize damage to the cell's separator and/or to remove gas being produced within the cell without slug or plug flow of the gas or the electrolyte). In an example, the maximum capacity current density is 1.5 $A/cm^2$ or more, for example 1.6 $A/cm^2$ or more, 1.7 $A/cm^2$ or more, 1.75 $A/cm^2$ or more, 1.8 $A/cm^2$ or more, 1.9 $A/cm^2$ or more, 2 $A/cm^2$ or more, 2.1 $A/cm^2$ or more, 2.2 $A/cm^2$ or more, 2.25 $A/cm^2$ or more, 2.3 $A/cm^2$ or more, 2.4 $A/cm^2$ or more, 2.5 $A/cm^2$ or more, 2.6 $A/cm^2$ or more, 2.7 $A/cm^2$ or more, 2.75 $A/cm^2$ or more, 2.8 $A/cm^2$ or more, 2.9 $A/cm^2$ or more, 3 $A/cm^2$ or more, 3.1 $A/cm^2$ or more, 3.2 $A/cm^2$ or more, 3.25 $A/cm^2$ or more, 3.3 $A/cm^2$ or more, 3.4 $A/cm^2$ or more, or 2.5 $A/cm^2$.

In an example, "load shedding" (i.e., situations where the operating current density of the electrolyzer cells is reduced in response to high or increasing electricity demand or price) includes reducing the operating current density of the electrolyzer cell to 30% or less of the maximum capacity, for example 29% or less of the maximum capacity, 28% or less of the maximum capacity, 27% or less of the maximum capacity, 26% or less of the maximum capacity, 25% or less of the maximum capacity, 24% or less of the maximum capacity, 23% or less of the maximum capacity, 22% or less of the maximum capacity, 21% or less of the maximum capacity, 20% or less of the maximum capacity, 19% or less of the maximum capacity, 18% or less of the maximum capacity, 17.5% or less of the maximum capacity, 17% or less of the maximum capacity, 16% or less of the maximum capacity, 15% or less of the maximum capacity, 14% or less of the maximum capacity, 13% or less of the maximum capacity, 12.5% or less of the maximum capacity, 12% or less of the maximum capacity, 11% or less of the maximum capacity, 10% or less of the maximum capacity, 9% or less of the maximum capacity, 8% or less of the maximum capacity, 7.5% or less of the maximum capacity, 7% or less of the maximum capacity, 6% or less of the maximum capacity, or 5% or less of the maximum capacity.

In an example, "load gaining" (i.e., situations where the operating current density of the electrolyzer cells is increased in response to low or decreasing electricity demand or price) includes increasing the operating current density to 70% or more of the maximum capacity, 75% or more of the maximum capacity, 76% or more of the maximum capacity, 77% or more of the maximum capacity, 77.5% or more of the maximum capacity, 78% or more of the maximum capacity, 79% or more of the maximum capacity, 80% or more of the maximum capacity, 81% or more of the maximum capacity, 82% or more of the maximum capacity, 82.5% or more of the maximum capacity, 83% or more of the maximum capacity, 84% or more of the maximum capacity, 85% or more of the maximum capacity, 86% or more of the maximum capacity, 87% or more of the maximum capacity, 87.5% or more of the maximum capacity, 88% or more of the maximum capacity, 89% or more of the maximum capacity, 90% or more of the maximum capacity, 91% or more of the maximum capacity, 92% or more of the maximum capacity, 92.5% or more of the maximum capacity, 93% or more of the maximum capacity, 94% or more of the maximum capacity, 95% or more of the maximum capacity, 96% or more of the maximum capacity, 97% or more of the maximum capacity, 97.5% or more of the maximum capacity, 98% or more of the maximum capacity, 98.5% or more of the maximum capacity, 99% or more of the maximum capacity, 99.5% or more of the maximum capacity, 99.9% or more of the maximum capacity, or to the maximum capacity (i.e., to 100% of the maximum capacity).

In an example, the electrolyzer system (i.e., comprising all of the electrolyzer cells in the plan can generate at least about 1 kilogram of $H_2$ gas per hour (kg $H_2$/hr), such as at least about 1.5 kg $H_2$/hr, at least about 5 kg $H_2$/hr, at least about 10 kg $H_2$/hr, at least about 25 kg $H_2$/hr, at least about 50 kg $H_2$/hr, at least about 100 kg $H_2$/hr, at least about 500 kg $H_2$/hr, at least about 1000 kg $H_2$/hr, at least about 1500 kg $H_2$/hr, at least about 2000 kg $H_2$/hr, at least about 2500 kg $H_2$/hr, at least about 3000 kg $H_2$/hr, at least about 3500 kg $H_2$/hr, at least about 4000 kg $H_2$/hr, at least about 4500 kg $H_2$/hr, or at least about 5000 kg $H_2$/hr. In an example, the electrolyzer system can generate up to about 30000 kg $H_2$/hr, for example up to about 25000 kg $H_2$/hr, up to about 20000 kg $H_2$/hr, up to 15000 kg $H_2$/hr, or up to 10000 kg $H_2$/hr. As will be appreciated by a person of skill in the art, the actual mass of $H_2$ gas produced by the electrolyzer system will depend on many factors including the area of each electrolyzer cell, the number of electrolyzer cells in the electrolyzer system, and the current density at which the electrolyzer cells are being operated. In an example, the mass of $H_2$ gas that can theoretically generated per ampere of current supplied to the electrolyzer cells is about $3.761 \times 10^{-5}$ kg $H_2$/hr. Therefore, the theoretical mass of $H_2$ gas that the electrolyzer system can generate is equal to the total amps supplied for electrolysis, which in turn is equal to the current density being applied to the electrolyzer cells multiplied by the total area of the electrolyzer cells (or the area per electrolyzer cell times the number of cells times the current density).

As explained in more detail below, the ability to dynamically load gain and load shed can result in the overall average cost of $H_2$ gas production per kilogram ($/kg) to be lower than is possible with conventional electrolyzer cells operated in a steady-state manner. In some examples, described in more detail below, the dynamic load gaining and load shedding of the present disclosure can allow for a reduction of from about 20% to about 40% or more (e.g., even as much as 50% or more) in the cost of electricity required to produce the same amount of $H_2$ gas.

Figure 22:
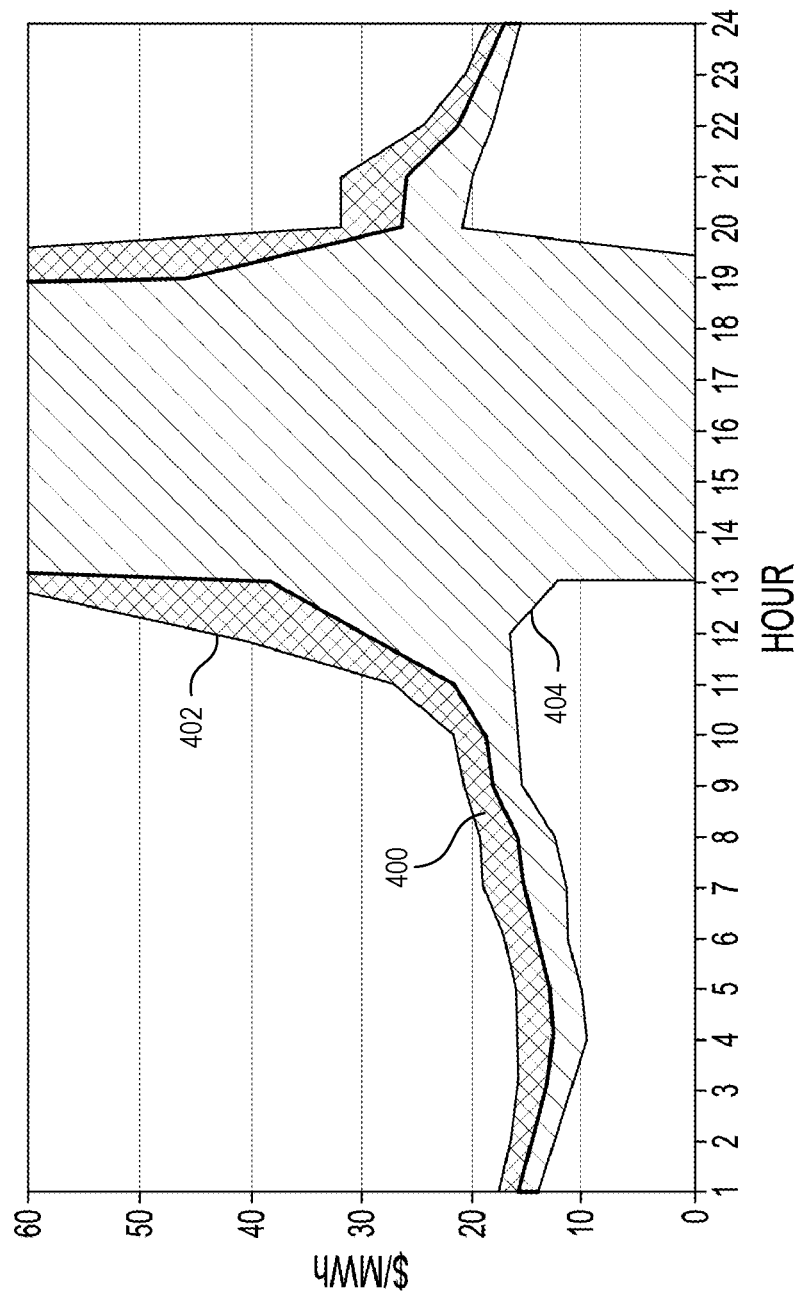
FIG. 22 is a graph of example electricity prices over the course of a typical 24 hour period.

FIG. 22 is a graph illustrating typical prices of electricity over a twenty-four hour period (e.g., from midnight to midnight of the following day), according to data collected by the Electric Reliability Council of Texas ("ERCOT"). Data line 400 represents the average price of electricity, in United States dollars per megawatt hour ($/MWh), at a particular time in the day. Data lines 402 and 404 represents one standard deviation above and one standard deviation below the average price at each particular time in the day, respectively. As can be seen by FIG. 22, the price of electricity tends to remain relatively steady from hour 1 (i.e., midnight) until about hour 10 (i.e., 9 AM), at which point the average price goes up rather steeply to above $60/MWh and with a large variation. The high average price and high variability remains until about hour 19 or hour 20 (e.g., 6-7 PM), at which point the average price begins to drop back down toward the more stable price experienced at the beginning of the day. In other words, the price of electricity tends to be low and has little variance during nighttime and early morning hours and then tends to go up and have large variability during mid-day and afternoon hours. The ability to dynamically operate the electrolyzer cells by load shedding and load gaining can allow the operator to, for example, operating the electrolyzer cells at high load (i.e., high current density, e.g., above a specified current density, such as above 1 A/cm²) during periods of low electricity pricing (i.e., during the night time such as from hours 1-10 and after about hour 22 in the graph of FIG. 22) and then operating the electrolyzer cells at low load (i.e., low current density, e.g., below the specified current density) during periods of high electricity pricing (i.e., during the day time from hours 10-22 in the graph of FIG. 22) can allow the systems and methods described herein to dynamically respond to electricity prices and, as described below, to achieve an overall electricity cost that is less than what would be incurred by conventional, steady-state operation.

Figure 23:
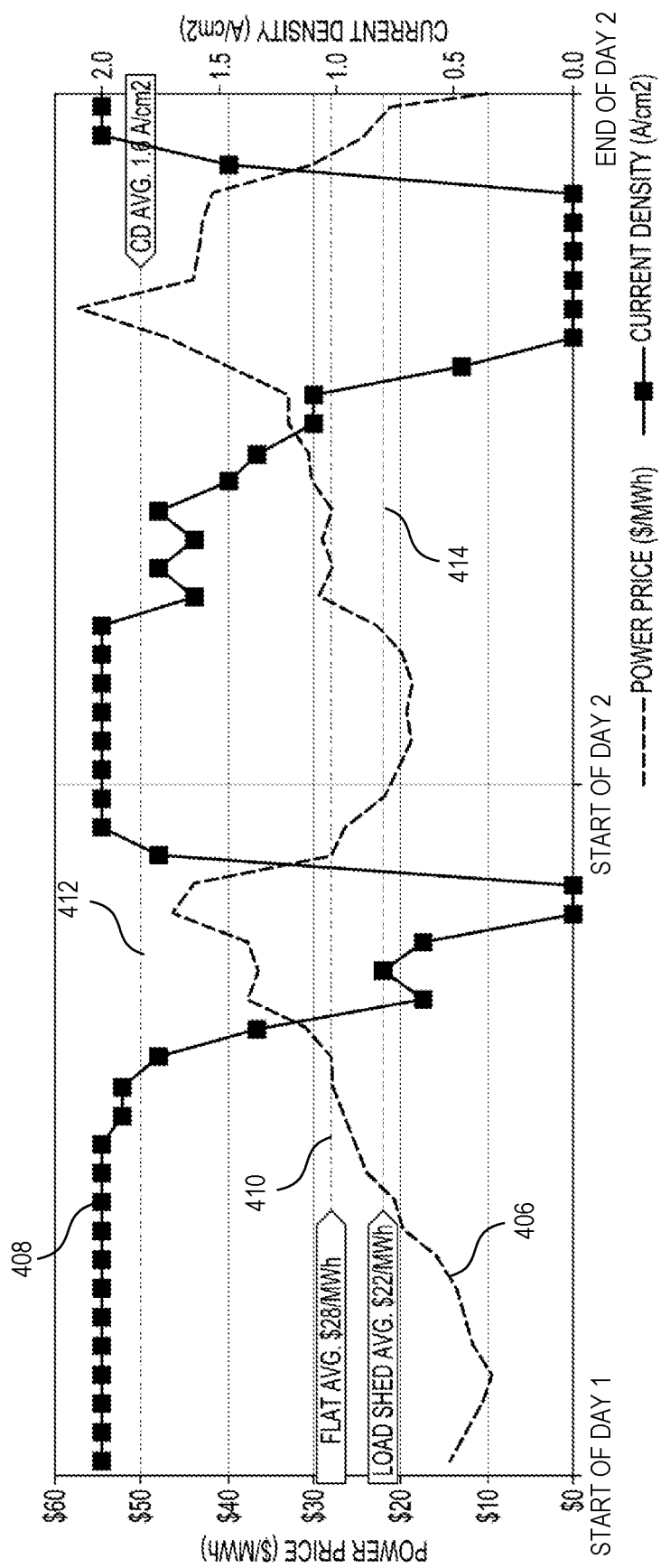
FIG. 23 is a graph showing an example the operation of electrolyzer cells for the generation of hydrogen gas according to the load gaining and load shedding methods of the present disclosure.

FIG. 23 shows an example scenario involving changes in electricity pricing and how the systems and methods described herein can be dynamically operated in load gaining and load shedding manners in order to reduce the overall average price of $H_2$ gas production compared to conventional operation of electrolyzer cells at a constant or substantially constant current density and $H_2$ gas production rate that does not take into account the current price of electricity. Data line 406 corresponds to the fluctuating price of electricity over the course of two full days of operation. Line 408 is a data series of the operating current density of the electrolyzer cells according to the present disclosure at various times over the course of the same two days when the electrolyzer cells are being operated to load gain during periods when the electricity price is below a specified lower price threshold (e.g., about $25 per MWh in the example of FIG. 23), where the current density is ramped down when the price of electricity goes above the specified lower price threshold, and where the electrolyzer cells are shut off (i.e., operated at a current density of 0 A/cm²) when the price of electricity goes above a specified upper price threshold (e.g., about $40 per MWh in the example of FIG. 23). Data line 410 corresponds to the "nominal" current density at which the electrolyzer cells are designed to be operated (e.g., about 1 A/cm² for the example of FIG. 23). In other words, data line 410 represents "conventional" operation of the electrolyzer cells at the capacity for which they were designed. As can be seen in FIG. 23, if the electrolyzer cells were continually operated at the nominal current density, then the average price of electricity over the two days represented by the data of FIG. 23 would be $28 per MWh.

In the example of FIG. 23, the electrolyzer cells are operated at a load gaining current density (e.g., about 2 A/cm²) when the electricity price is below the specified lower price threshold (e.g., when the price is ≤$25 per MWh in the example of FIG. 23), at a variable load shedding current density when the price of electricity is between the specified lower price threshold and the specified upper price threshold (e.g., when the price is between $25/MWh and $40/MWh in the example of FIG. 23, the current density is set somewhere between 0 and 2 A/cm² depending on the electricity price), and are shut down if the price is above the specified upper price threshold (e.g., a current density of 0 A/cm² when the price is greater than $40/MWh in the example of FIG. 23). In the example scenario shown in FIG. 23, the average current density over the course of the two days was about 1.6 A/cm² (as represented by data line 412), which is about 60% higher than the nominal current density of 1 A/cm² during conventional operation of the electrolyzer cells (e.g., above the current density associated with data line 410). Moreover, the average cost of the electricity consumed over the course of the two days of operation was about $22 per MWh (represented by data line 414), which corresponds to about a 20% reduction in the cost of electricity during the load gaining and load shedding operation of the present disclosure. In other words, in the example scenario shown in FIG. 23, not only was the electricity cost substantially lower than conventional operation of the electrolyzer cells (i.e., about $22/MWh versus about $28/MWh, or 20% less electricity cost over the same period of time), the same electrolyzer cells were able to achieve a substantially higher average current density (i.e., about 1.6 A/cm² on average versus 1 A/cm², or about 60% higher). As will be appreciated by those having skill in the art, this means that the same electrolyzer cells were also able to produce substantially more $H_2$ gas (because the production rate of $H_2$ gas is proportional to the current density) at a substantially lower operating cost.

The example scenario and the threshold electricity prices of FIG. 23 are provided for illustrative purposes only and are not intended to limit the scope of the present disclosure. Those having skill in the art will appreciate that the operating current densities of the electrolyzer cells and the threshold electricity prices that trigger adjustment of the operating current density can be varied and will still be encompassed by the present disclosure. As noted above, the electrolyzer cells that can be incorporated into the load gaining and load shedding systems and methods of the present disclosure can operate over a wide range of current densities, for example from a lower limit of about 0.15 $A/cm^2$ up to an upper limit of 3 $A/cm^2$ or more. This large dynamic range of operating current densities can allow an operator with considerable flexibility to choose a minimum electricity price threshold at which to start the transition from a load gaining current density to a load shedding current density and a maximum electricity price threshold at which to operate a load shedding current density or to shut off the electrolyzer cells completely, and to include one or more additional intermediate price thresholds at which to set one or more intermediate operating current densities.

Those having skill in the art may also appreciate that the specific operating current density for each price threshold can be selected based on aspects of the specific electrolyzer cells, including, but not limited to: an optimal current density for the particular electrolyzer cell (e.g., the current density that is most efficient at producing $H_2$ gas on the basis of the mass of $H_2$ gas produced per MW of electricity consumed, which itself can depend on the price of electricity), a maximum current density that the electrolyzer cell can achieve (e.g., depending on the electrolyzer cell's ability to remove the gas produced and/or dissipate the heat generated), or the cost per kilogram of $H_2$ gas produced for the electrolyzer cells at various current densities and at various electricity prices per MWh.

Figure 24:
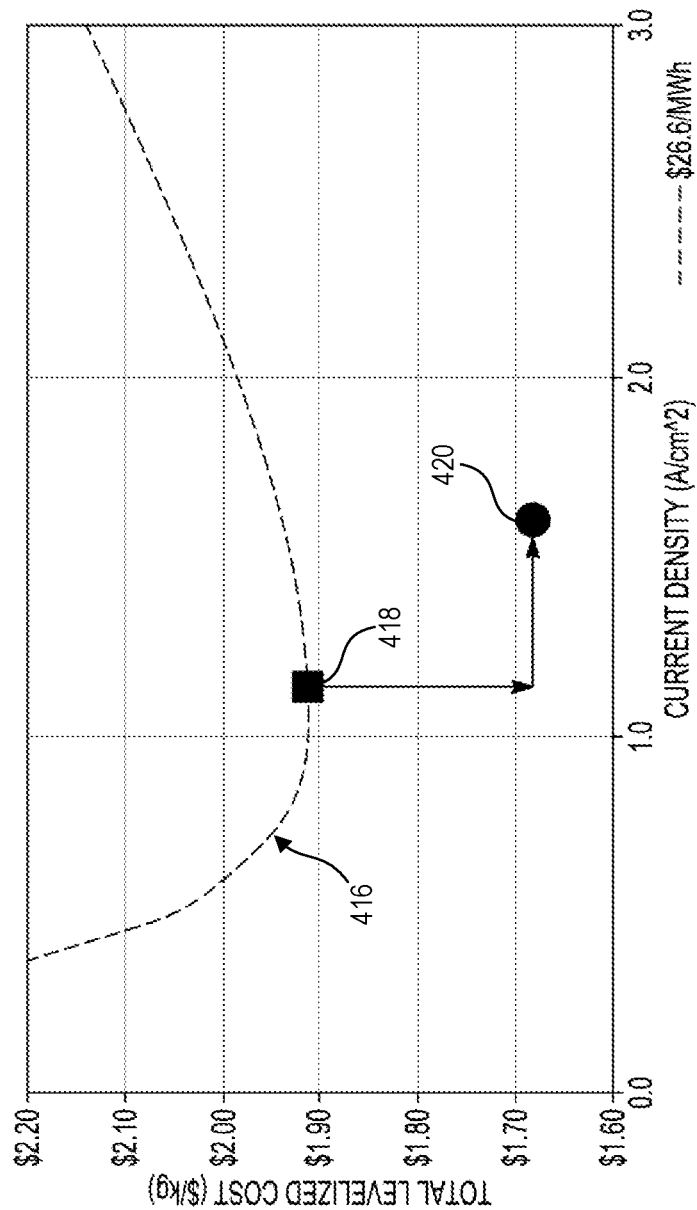
FIG. 24 is a graph showing the cost per kilogram of produced hydrogen gas for an example electrolyzer cell and the improvement that can be achieved by generating hydrogen gas according to the load gaining and load shedding methods of the present disclosure.
Figure 25:
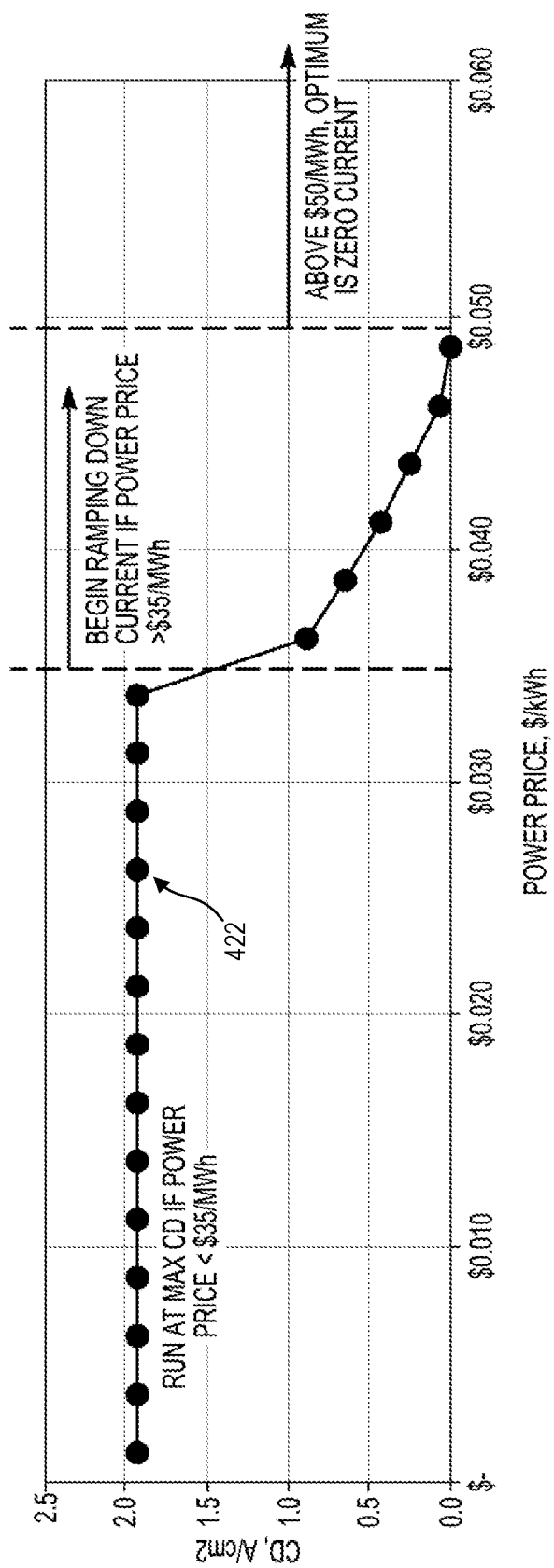
FIG. 25 is a graph showing an optimal operating current density for an example electrolyzer cell at various electricity prices.

FIGS. 24 and 25 show examples of these considerations for a particular electrolyzer cell. FIG. 24 shows a cost curve (represented by line 416) for a particular example electrolyzer cell. The cost curve 416 corresponds to the total levelized cost per kilogram of $H_2$ gas produced at different operating current densities when the price of electricity is $26.6/MWh. For this example, electrolyzer cell, the cost curve 416 has a minimum point 418 at a current density of about 1.12 $A/cm^2$, corresponding to a production cost of about $1.91 per kg of $H_2$ gas produced. The cost curve 416 in FIG. 24 corresponds to the cost if the electrolyzer cell was operated at a constant current density rather than the cost if the load gaining and load shedding methods of the present disclosure are being practiced. In other words, the cost curve 416 corresponds to the example electrolyzer cell being operated in the conventional manner, similar to the line 410 of FIG. 23. If, however, the load gaining and load shedding method of the present disclosure is practiced (e.g., similar to the example described above with respect to FIG. 23), then the effective optimum current density for the same example electrolyzer cell (at data point 420) rises to about 1.66 $A/cm^2$ (an increase of about 40% over the 1.19 $A/cm^2$ for the minimum point 418 on the conventional cost curve 416) and the average cost per kilogram of $H_2$ is reduced to about $1.69/kg $H_2$ (a reduction of about 11.5% compared to the $1.91/kg $H_2$ for the minimum point 418 on the conventional cost curve 416).

FIG. 25 shows a graph of the optimum current density (represented by data line 422) for a particular example electrolyzer cell as a function of the price of electricity. As used herein, the term "optimum current density" refers to the current density that achieves the minimum cost per kilogram of $H_2$ produced at a particular electricity price. In an example, the optimum current density for each electricity price can be determined in much the same way as was performed in FIG. 24, e.g., by finding a minimum point on the cost curve associated with each electricity price. In the example of FIG. 25, when the price is below about $35/MWh (or $0.035/kWh), the optimum current density is at or above the maximum current density for which the example electrolyzer cell can operate, so that when the price is below $35/MWh, the electrolyzer cell can be run at its maximum current density of about 2 $A/cm^2$ (e.g., the electrolyzer cell can be operated in a full load gaining manner). At a price of about $35/MWh, the optimum current density begins to go down as the price rises such that, in an example, the operating current density for the electrolyzer cell can be ramped down as the electricity price rises above $35/MWh. In other words, in the example of FIG. 25, $35/MWh is the specified lower price threshold corresponding to the start of the transition between load gaining and load shedding (as described above with respect to FIG. 23). As shown in FIG. 25, when the price of electricity reaches about $50/MWh, the optimum current density for the example electrolyzer cell reaches zero (0) (ignoring other considerations such as the costs of shutdown and startup labor, wear on the plant equipment, and the like). Therefore, when the price is higher than $50/MWh, the example electrolyzer cell can be shut down. In other words, in the example of FIG. 25, $50/MWh is the specified upper price threshold (as described above with respect to FIG. 23). Those having skill in the art will appreciate that the exact price point for the specified upper price threshold can be varied from the actual price point where the optimum current density reaches zero, and the amount of variance can depend on one or more factors including, but not limited to, the capital expenditure for the example electrolyzer cells and other supporting equipment (e.g., the CapEx), the overall size of the electrolyzer cells in the plant (e.g., the size of the cell stack), the current price at which the produced $H_2$ gas can be sold, and other operating expenses (such as the cost of labor to run the plant or to shut down and startup the plant or the price of water, or the cost of regular maintenance for the electrolyzer cells and the supporting equipment). In fact, the "optimum" current density at any point along the optimum current density curve 422 can be varied from the theoretical or calculated optimum current density based on one or more of these same factors.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for carrying out electrolysis comprising:
at least twice within a 24 hour period, performing a dynamic adjustment of a current density associated with an operation of an electrolyzer within a range of values of about 0.15 A/cm$^2$ and 3.0 A/cm$^2$ in response to a change in price of electricity within a region where the electrolyzer is located;
wherein each dynamic adjustment of the current density comprises operating the electrolyzer at a first current density within the range of values of about 0.15 A/cm$^2$ and 3.0 A/cm$^2$ when the price of electricity within the region is at a first price, raising the current density of the electrolyzer above the first current density within the range of values of about 0.15 A/cm$^2$ and 3.0 A/cm$^2$ when the price of electricity within the region decreases below the first price, and decreasing the current density of the electrolyzer below the first current density within the range of values of about 0.15 A/cm$^2$ and 3.0 A/cm$^2$ when the price of electricity within the region increases above the first price.

2. The method of claim 1, wherein the change in the price of electricity within the region occurs for a period of time when demand for electricity within the region is fluctuating.

3. The method of claim 2, wherein an average price of electricity within the region over the period of time is elevated compared to another period of time.

4. The method of claim 2, wherein an average price of electricity within the region over the period of time is decreased compared to another period of time.

5. The method of claim 2, wherein the period of time is one where the price of electricity within the region typically increases or decreases.

6. The method of claim 5, wherein the period of time is between specific hours within a day.

7. The method of claim 1, wherein the electrolyzer comprises at least two separate electrolyzer cells.

8. The method of claim 1, wherein the electrolyzer has a total size of at least about 2.5 m$^3$.

9. The method of claim 1, wherein when the price of electricity within the region increases, an operating expenditure of the electrolyzer increases unless the current density is decreased.

10. A method for carrying out electrolysis comprising:
at least twice within a 24 hour period, performing a dynamic adjustment of a current density associated with an operation of an electrolyzer, wherein each dynamic adjustment of the current density comprises:
operating the electrolyzer at a first current density when the price of electricity within a region where the electrolyzer is located is at a first price;
operating the electrolyzer at a second current density that is lower than the first current density when the price of electricity within the region is at a second price that is higher than the first price; and
operating the electrolyzer at a third current density that is higher than the first current density when the price of electricity within the region is at a third price that is lower than the first price.

11. The method of claim 10, wherein the price of electricity within the region increases or the price of electricity within the region decreases, or both, during a period of time when the price of electricity within the region is fluctuating.

12. The method of claim 11, wherein an average price of electricity within the region over the period of time is elevated compared to another period of time.

13. The method of claim 11, wherein an average price of electricity within the region over the period of time is decreased compared to another period of time.

14. The method of claim 11, wherein the period of time is one where the price of electricity within the region typically increases or decreases.

15. The method of claim 14, wherein the period of time is between specific hours within a day.

* * * * *